(12) United States Patent
Burba et al.

(10) Patent No.: US 9,219,782 B2
(45) Date of Patent: Dec. 22, 2015

(54) IDENTIFYING SEED COMPUTING DEVICES USING ESTIMATES IN PEER-TO-PEER NETWORKS

(71) Applicant: MICROSOFT CORPORATION, Redmond, WA (US)

(72) Inventors: Alexander Burba, Seattle, WA (US); Brandon Hunt, Redmond, WA (US); Frank R. Morrison, III, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 117 days.

(21) Appl. No.: 13/711,152

(22) Filed: Dec. 11, 2012

(65) Prior Publication Data

US 2014/0164627 A1    Jun. 12, 2014

(51) Int. Cl.
*G06F 15/16* (2006.01)
*H04L 29/08* (2006.01)

(52) U.S. Cl.
CPC .......... *H04L 67/1085* (2013.01); *H04L 67/101* (2013.01); *H04L 67/104* (2013.01); *H04L 67/1008* (2013.01); *H04L 67/1021* (2013.01); *H04L 67/1063* (2013.01); *H04L 67/325* (2013.01)

(58) Field of Classification Search
CPC .............. H04L 67/104; H04L 67/1061; H04L 67/1085; H04L 67/1072
See application file for complete search history.

(56) References Cited

U.S. PATENT DOCUMENTS

| 7,133,368 | B2 | 11/2006 | Zhang et al. |
| 7,194,002 | B2 | 3/2007 | Zhang et al. |
| 7,720,996 | B2 * | 5/2010 | Soles et al. ................... 709/245 |
| 8,126,985 | B1 * | 2/2012 | Kandekar et al. ............. 709/217 |

(Continued)

FOREIGN PATENT DOCUMENTS

| EP | 1515520 A2 * | 3/2005 | .............. H04L 29/08 |
| EP | 1821487 A1 | 8/2007 | |

OTHER PUBLICATIONS

Huang, et al., "Clustering Model of P2P CDN Based on the Prediction of User Requirements", In Proceedings of Journal of Networks, Mar. 2012, 8 pages.

(Continued)

*Primary Examiner* — Lance L Barry
(74) *Attorney, Agent, or Firm* — Aaron Chatterjee; Kate Drakos; Micky Minhas

(57) ABSTRACT

Embodiments disclosed herein relate to methods and devices for identifying other computing devices of a peer-to-peer network to which to effect or recommend that a specific computing device send a download request for specific digital content. This can involve accessing information regarding other computing devices that currently have the specific digital content and other computing devices that are currently in a process of obtaining the specific digital content, and determining, based on the accessed information, estimates of amounts of time it will take for the specific computing device to download the specific digital content from the other computing devices that currently have the specific digital content, and from the other computing devices that are currently in the process of obtaining the specific digital content. Based on the estimates, one or more of the other computing devices to which to send the download request for the specific digital content is/are identified.

18 Claims, 11 Drawing Sheets

| Computing Device | Currently Have Specific Digital Content | Currently In Process of Obtaining Specific Digital Content | Download Estimate |
|---|---|---|---|
| 112₂ | Yes | No | 10 min |
| 112₃ | Yes | No | 15 min |
| 112₄ | No | Yes | 8 min |
| 112₅ | No | Yes | 20 min |
| . | . | . | . |
| . | . | . | . |
| . | . | . | . |
| 112ₙ | No | No | No estimate |

(56) References Cited

U.S. PATENT DOCUMENTS

| | | | |
|---|---|---|---|
| 8,335,844 B2* | 12/2012 | Chapalamadugu et al. | 709/223 |
| 8,341,283 B2* | 12/2012 | Argawal et al. | 709/231 |
| 2008/0252925 A1* | 10/2008 | Ogasawara | 358/1.15 |
| 2009/0100128 A1 | 4/2009 | Czechowski et al. | |
| 2009/0182815 A1* | 7/2009 | Czechowski et al. | 709/206 |
| 2009/0240758 A1 | 9/2009 | Pasko et al. | |
| 2009/0254659 A1* | 10/2009 | Li et al. | 709/225 |
| 2010/0011060 A1 | 1/2010 | Hilterbrand et al. | |
| 2010/0050181 A1 | 2/2010 | Zhang | |
| 2011/0010258 A1 | 1/2011 | Chavez et al. | |
| 2011/0191418 A1* | 8/2011 | Yang et al. | 709/204 |
| 2014/0164627 A1* | 6/2014 | Burba et al. | 709/227 |

OTHER PUBLICATIONS

Hwang, et al., "Stored Media Streaming in BitTorrent-like P2P Networks", In proceedings of the ACM SIGMETRICS International Conference on Measurement and Modeling of Computer Systems, Jun. 1, 2008, 12 pages.

Filho, et al., "BitTorrent-Like Protocols for Interactive Access to VoD Systems", In proceeding of European Journal of Scientific Research, Oct. 10, 2012, 20 pages.

Esposito, et al., "Seed Scheduling for Peer-to-Peer Networks", In proceeding of Network Computing and Applications, Jul. 9, 2009, 8 pages.

Ketmaneechairat, et al., "Peer Clustering System for Different Start Video Broadcasting", In Proceedings of the Sixth International Conference on Digital Telecommunications, Jul. 2011, 7 pages.

Karagiannis, et al., "Should Internet Service Providers Fear Peer-Assisted Content Distribution", In Proceedings of the 5th ACM SIGCOMM Conference on Internet Measurement, Oct. 2005, 14 pages.

"International Search Report & Written Opinion" mailed Jun. 13, 2014, for PCT Patent Application No. PCT/US2013/074504 filed Dec. 11, 2013, 19 Pages.

Palau, et al., "Improving BitTorrent Download Times Using Community Partners", In IEEE Conference on Local Computer Networks, Oct. 4, 2011, pp. 333-340.

* cited by examiner

| Time Zones | UTC-11&-12 | ... | UTC-3 | UTC-2 | UTC-1 | UTC+0 | UTC+1 | UTC+2 | ... | UTC+12 |
|---|---|---|---|---|---|---|---|---|---|---|
| UTC-11&-12 | | | | | | | | | | |
| ... | | | | | | | | | | |
| UTC-3 | | | | | | | | | | |
| UTC-2 | | | | | | | | | | |
| UTC-1 | | | | | | | | | | |
| UTC+0 | | | | | | | | | | |
| UTC+1 | | | | | | | | | | |
| UTC+2 | | | | | | | | | | |
| UTC+3 | | | | | | | | | | |
| ... | | | | | | | | | | |
| UTC+12 | | | | | | | | | | |

*FIG. 5*

IDENTIFYING SEED COMPUTING DEVICES USING ESTIMATES IN PEER-TO-PEER NETWORKS

BACKGROUND

Digital content, such as a video game, is often available for direct download over the Internet from a digital content provider, thereby eliminating the need for a user to install such digital content on their computing device using an optical storage disc or some other data storage device. However, such digital content may comprise a large amount of data, and therefore may take a potentially significant amount of time to download in full. Additionally, a significant amount of digital content provider resources and network resources may be used to transfer the digital content from the digital content provider to the user's computing device, which can also be referred to as a client. The amount of time, digital content provider resources and network resources used to transfer such digital content is exacerbated when numerous computing devices attempt to download the same digital content at the same time, which often occurs when digital content is initially released or updated.

SUMMARY

Various embodiments disclosed herein can be used to improve the distribution of digital content in a peer-to-peer network. In some such embodiments, information regarding computing devices that currently have specific digital content is collected, as is information regarding computing devices that are currently in the process of obtaining the specific digital content. Based on such information, future snapshots of a peer-to-peer network can be predicted and used to determine that in certain instances a computing device may be better off waiting until a future point in time to attempt to download specific digital content, rather than immediately attempting to perform the download.

In certain embodiments, computing devices are mapped into different groups based on location information, and inter-group information is collected and used to identify other computing devices to which it would be efficient and effective for a computing device to send download requests for digital content.

In certain embodiments, information indicative of scarcity associated with different digital content units is collected, and the distribution of the digital content units is prioritized based on such information.

In certain embodiments, computing devices are grouped into clusters of computing devices, and different computing devices within the same cluster are instructed or recommended to send download requests for different digital content units to computing devices outside of the cluster so that the plurality of computing devices within the same cluster will collectively obtain all of the different digital content units. The computing devices within the same cluster can then share the digital content units with one another.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 illustrates an exemplary table that provides an example of the type of information that may be accessed and used when performing the steps of the flow diagram of FIG. 4.

DETAILED DESCRIPTION

Figure 1:
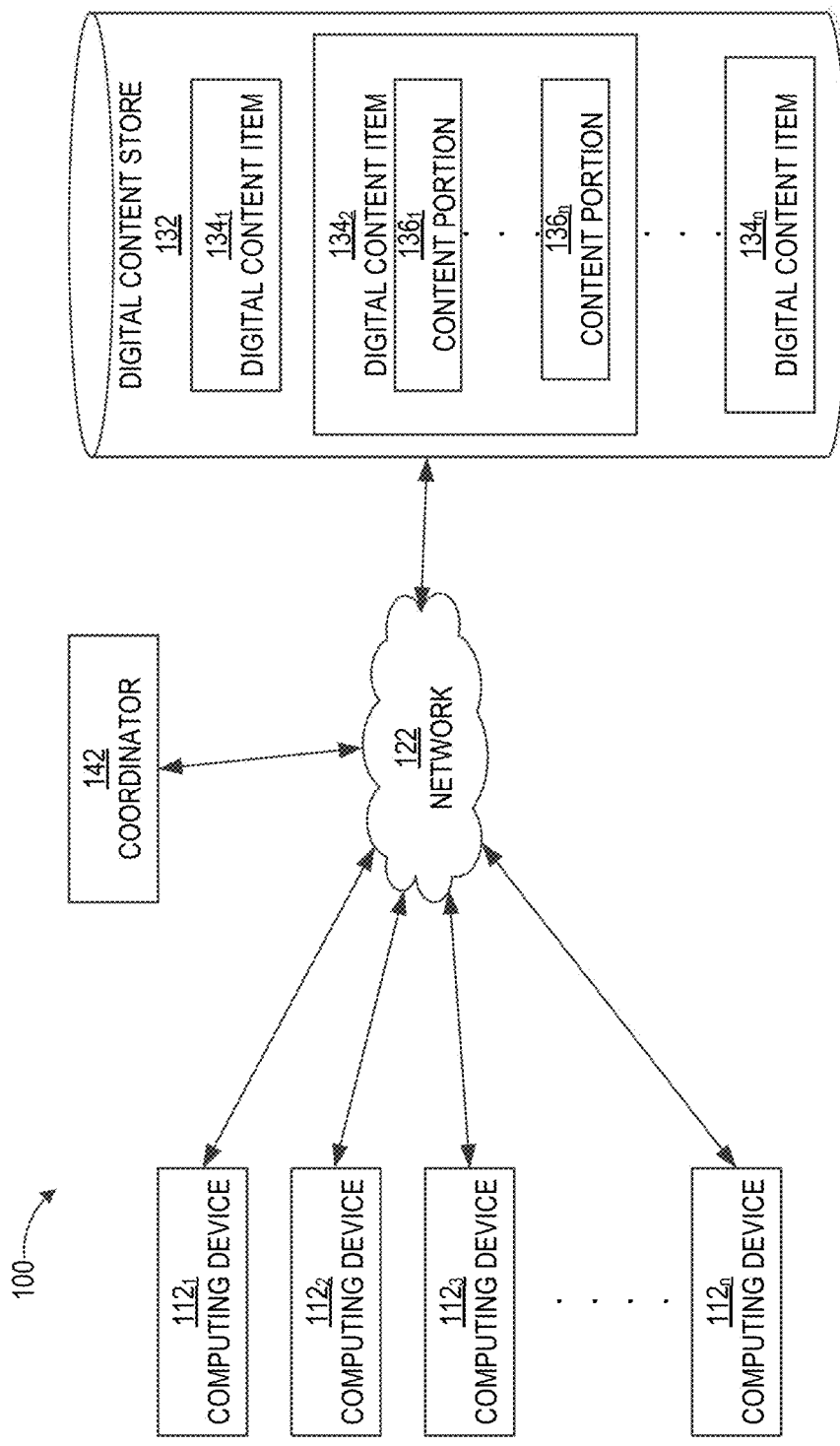
FIG. 1 shows an exemplary use environment with which at least some of the embodiments described herein can be implemented.

A peer-to-peer (P2P) network can be used to reduce the amount of digital content provider resources, network resources and the amount of time used to distribute digital content, such as a video game, to a plurality of computing devices.

In certain embodiments, in order to improve the distribution of a specific digital content, information regarding computing devices that currently have the specific digital content is collected, as is information regarding computing devices that are currently in a process of obtaining the specific digital content. Based on such information, computing devices to which to send a download request (for the specific digital content) are identified and download requests are effected or recommended to cause a peer-to-peer transfer of the specific digital content in an efficient and effective manner. Such embodiments predict future snapshots of the peer-to-peer network and determine that in certain instances, rather than immediately attempting to begin a peer-to-peer transfer of digital content it would be better to wait until a future point in time to begin such a transfer.

In certain embodiments, computing devices are mapped to plurality of different groups based on location information (e.g., time zone and/or geographic region information). Additionally, inter-group information including, e.g., inter-group data transfer rates and/or inter-group availability, is collected. Based on the inter-group information, computing devices to which it would be efficient and effective to send download requests for digital content are identified, and such download requests are effected or recommended.

In certain embodiments, information indicative of scarcity associated with each of the plurality of different digital content units is collected, and the distribution of the digital content units is prioritized in a manner that reduces the scarcity of digital content units having scarcity that exceeds a specified level. Distribution of the digital content units is effected based on results of the prioritizing in order to reduce the scarcity of digital content units having scarcity that exceeds the specified level. Such embodiments should have the effect of improving the distribution of digital content units between computing devices of the peer-to-peer network.

In certain embodiments, computing devices are grouped into clusters of computing device such that each of the clusters includes a plurality of computing devices. For each of the clusters, different computing devices within the same cluster are instructed or recommended to send download requests for different digital content units to computing devices outside of the cluster so that the plurality of computing devices within the same cluster will collectively obtain all of the different digital content units. Such embodiments should also have the effect of improving the distribution of digital content units between computing devices of the peer-to-peer network.

Prior to discussing the above mentioned embodiments in more detail, an example embodiment of a use environment 100 is described with reference to FIG. 1. The exemplary use environment 100 comprises a plurality of computing devices $112_1$, $112_2$, $112_3$ . . . $112_n$, which can be referred to collectively as computing devices 112, and can be referred to individually as a computing device 112. Each computing device 112, which is configured to receive, process and present digital content, is associated with a corresponding user. In some instances, more than one computing device may be associated with a same user. For example, a user may have two or more of a video game console, a mobile device, a computer (e.g., laptop, desktop, tablet), a wearable device (e.g. head-mounted display), etc., and may consume digital content on each of these computing devices.

Each computing device can be in communication with one or more digital content stores 132 (e.g., locations from which digital content may be downloaded) via a network 122 (e.g., computer network, cellular phone network, and/or any other suitable type of network). The digital content store 132 is depicted as storing a plurality of digital content items $134_1$, $134_2$ . . . $134_n$, which can be referred to collectively as digital content items 134, and can be referred to individually as a digital content item 134. The digital content store can be supported by a content delivery network (CDN), but is not limited thereto. Each computing device 112 may also be in communication with one or more other computing devices 112 in a peer-to-peer arrangement for receiving digital content from peer computing devices. At any given time, the computing devices 112 that are participating in, or are available for, peer-to-peer communication can be referred to as a swarm. A swarm is dynamic, in that computing devices can join or leave the swarm in response to users turning on and off their computing devices and/or users (or their computing devices) selectively enabling and disabling peer-to-peer communication capabilities. For a specific example, a computing device may temporarily disable all or some of its peer-to-peer capabilities so that resources, such as network, CPU and/or memory resources, can be used to preserve a user experience.

Each digital content item 134 comprises a plurality of content portions, examples of which are shown as content portions $136_1$ . . . $136_n$ for the digital content item $134_2$.

Digital content items 134 may represent any suitable type of digital content, including but not limited to interactive content such as video games, interactive video, and social media. Other examples include, but are not limited to, movies, television shows and other videos, music, photographs, websites, etc. Likewise, content portions may take any suitable form, such as, but not limited to, specific portions of memory (e.g. memory locations, disk sectors, etc.), or, by extension, specific files, or portions thereof.

Where the computing devices 112 are capable of performing peer-to-peer transfers of digital content, each computing device 112 can also be referred to as a peer node (or simply a peer or a node), and the entire use environment 100 can also be referred to as a peer-to-peer content distribution network (or simply a peer-to-peer network). In a peer-to-peer network, a plurality of nodes in a communications network have access to a peer-to-peer file sharing protocol and can use that protocol to try to obtain copies of particular digital content such as a file that is being distributed. The nodes in the network can each have one or more current connections using that protocol to others of the nodes. Thus nodes can join or leave the network as they drop or form connections to nodes already in the network. The connections need not always be actively used for content distribution although the connections need to be suitable for doing so using the particular protocol, which may or may not use network encoding. The connections can either be one-way or two-way connections. It is possible that a given node can be a member of more than one peer-to-peer network at a time.

FIG. 1 also shows a coordinator computing device 142, which can also be referred to as a coordinator node, or simply a coordinator. The coordinator 142 can collect and maintain information about the various computing devices 112, such as whether a computing device is participating in the peer-to-peer network and has any digital content to share. Additionally, the coordinator 142 can help computing devices 112 find other computing devices 112 that have needed or desired digital content. The coordinator 142 can be, for example, a tracker, but is not limited thereto. While only one coordinator 142 is shown in FIG. 1, the peer-to-peer content distribution network 100 can include multiple coordinators 142.

Improving P2P Performance Using Delayed Seeding

As mentioned above, certain embodiments relate to improving the distribution of a specific digital content, by collecting information regarding computing devices that currently have the specific digital content, as well as collecting information regarding computing devices that are currently in a process of obtaining the specific digital content. Based on such information, computing devices to which to send a download request (for the specific digital content) are identified and download requests are effected or recommended to cause a peer-to-peer transfer of the specific digital content in an efficient and effective manner. These embodiments predict future snapshots of the peer-to-peer network and determine that in certain instances, rather than immediately attempting to effect a peer-to-peer transfer of digital content it would be better to wait until a future point in time to effect such a transfer.

The high level flow diagram of FIG. 2, discussed below, is used to explain these embodiments. More specifically, FIG. 2 will now be used to describe a method for identifying one or more other computing devices of a peer-to-peer network to which to effect or recommend that a specific computing device (e.g., $112_1$ in FIG. 1) of the peer-to-peer network send one or more download requests for specific digital content. The specific digital content can either be an entire digital content item that includes a plurality of digital content portions (also referred to as digital content units), a specific digital content portion of a digital content item that includes a plurality of digital content portions, or a specific group of digital content portions of a digital content item.

Figure 2:
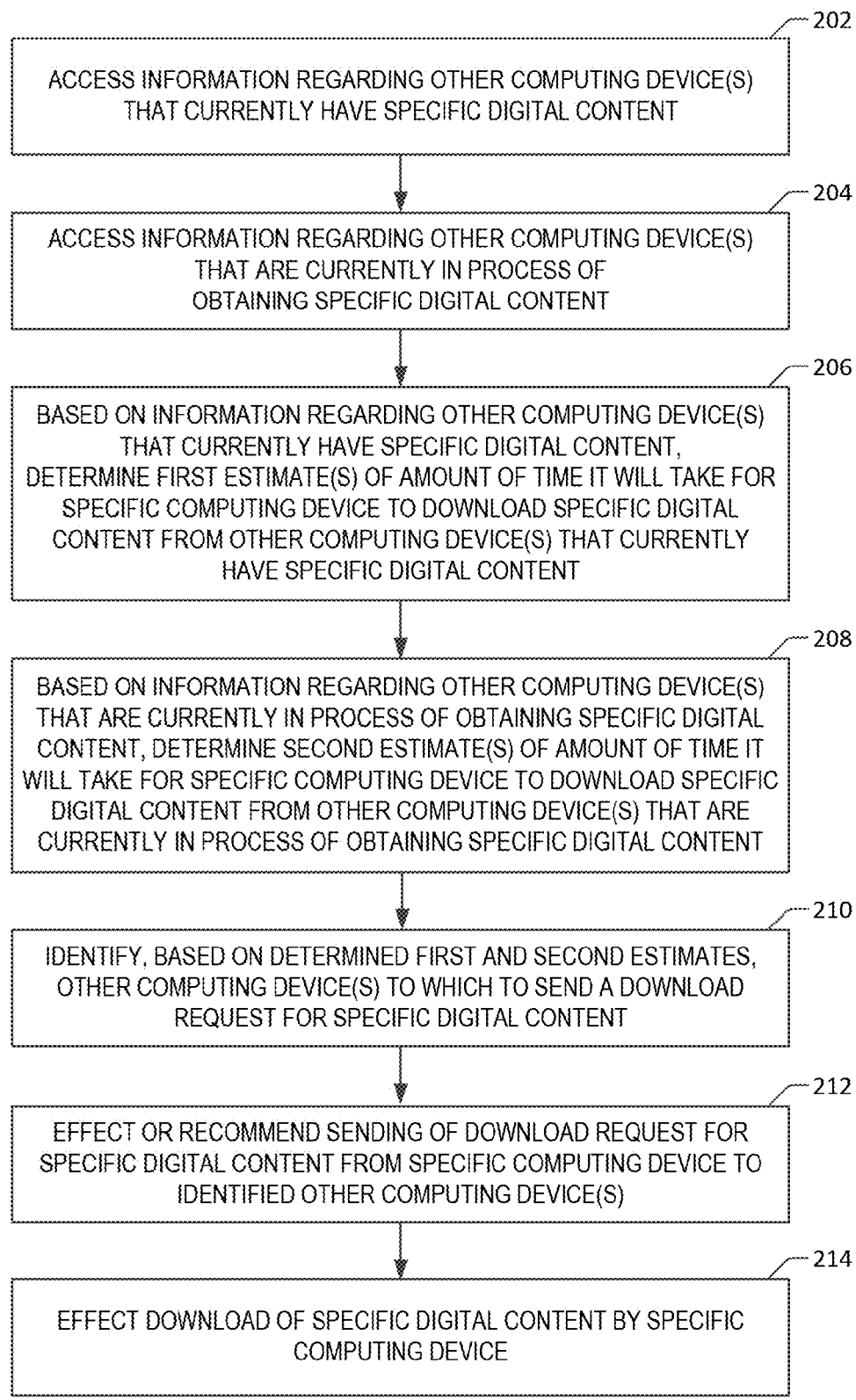
FIG. 2 shows a flow diagram depicting an embodiment of a method for identifying one or more other computing devices of a peer-to-peer network to which effect or recommend that a specific computing device of the peer-to-peer network send one or more download requests for specific digital content.

In accordance with an embodiment, the steps in FIG. 2 can be initiated in response to a computing device (e.g., $112_1$ in FIG. 1) indicating a need or desire to obtain specific digital content (e.g., a specific digital content portion). Referring to FIG. 2, at step 202, information is accessed regarding one or more of the other computing devices that currently have the specific digital content. At step 204, information is accessed regarding one or more of the other computing devices that are currently in a process of obtaining the specific digital content. In certain embodiments, a computing device that is currently in the process of obtaining the specific digital content has at least already sent a download request for the specific digital content, but may or may not have already began downloading the specific digital content. In other embodiments, a computing device that is currently in the process of obtaining the specific digital content has already began downloading the specific digital content.

The information accessed at steps 202 and 204 can include download speed information (which can also be referred to as data transfer rate information), computing device availability information, but is not limited thereto. In order for such information to be accessed, the information first needs to be collected. In certain embodiments, such information is collected and maintained by a coordinator (e.g., the coordinator 142 in FIG. 1). In other embodiments, each computing device 112 of the peer-to-peer network can collect and maintain such information for its own use. In still other embodiments, a specific computing device can collect and maintain some of the information and can also access some of the information from a coordinator. In other words, a specific computing device can access its own collected and maintained information and/or access information collected and maintained by a coordinator. More generally, the method described with reference to FIG. 1 can be performed either by the specific computing device that needs or desires the specific digital content (without any assistance from a coordinator), by a coordinator that communicates with the specific computing device and the other computing devices, or by a combination of the specific computing device and a coordinator.

As will be appreciated from the description below, the information accessed at steps 202 and 204 is used to identify one or more seeds for the specific computing device (e.g., the computing device $112_1$ in FIG. 1) that needs or desires the specific digital content. In a peer-to-peer network, a seed is a computing device that has the specific digital content that is needed or desired by another computing device, and is available and willing to source copies of the specific digital content (e.g., in response to a download request). In this description, a computing device that currently has the specific digital content, but will not be available as a seed until a later point in time (e.g., because they are currently off-line or too busy) can be referred to as a currently unavailable seed. A computing device that does not currently have the specific digital data content, but is currently in the process of obtaining the specific digital content, can be referred to as a future seed. The currently unavailable seed and the future seed are different examples of delayed seeds. A seed that currently has the specific digital content and is currently able to source copies of the specific digital content can be referred to as a currently available seed. At step 202, information regarding currently available seeds and currently unavailable seeds can be accessed. At step 204, information regarding future seeds can be accessed.

At step 206, based on the information regarding the other computing device(s) that currently have the specific digital content, there is/are determination(s) of first estimate(s) of an amount of time it will take for the specific computing device to download the specific digital content from each of one or more of the other computing devices that currently have the specific digital content. This does not necessarily mean that if there are twenty other computing devices that currently have the specific digital content that twenty estimates need to be determined Rather, it is possible that estimates may only be determined for some (e.g., ten) of the twenty other computing devices that currently have the specific digital content.

At step 208, based on the information regarding the other computing device(s) that are currently in the process of obtaining the specific digital content, there is/are determinations of second estimate(s) of an amount of time it will take for the specific computing device to download the specific digital content from each of one or more of the other computing devices that are currently in the process of obtaining the specific digital content. As was the case with step 206, at step 208 an estimate can be determine for each and every, or only some of the other computing devices that are currently in the process of obtaining the specific digital content.

In accordance with certain embodiments, each first estimate determined at step 206 is a sum of an estimate of an amount of time it will take until one of the other computing devices (e.g., $112_2$) that currently has the specific digital content is available for sourcing the specific digital content, plus an estimate of an amount of the time it will take for the specific computing device (e.g., $112_1$) to complete the download of the specific digital content once the other computing device (e.g., $112_2$) is available for sourcing the specific digital content. For example, assume that the computing device $112_2$ has the specific digital content that the computing device $112_1$ needs or desires, but the computing device $112_2$ will not be able to source the specific digital content until seven minutes from now (e.g., because the computing device $112_2$ will be busy seeding other computing devices and/or will be streaming a video for the next seven minutes). Also assume that once the computing device $112_2$ is available for sourcing the specific digital content, it is estimated it will take four minutes for the specific computing device $112_1$ to complete the download of the specific digital content from the computing device $112_2$. For this example, the first estimate determined at step 206 would be eleven minutes (i.e., seven minutes plus four minutes equals eleven minutes). In alternative embodiments, each first estimate is an estimate of an amount of time it will take for the specific computing device (e.g., $112_1$) to complete the download of the specific digital content once the download begins from one of the other computing devices that currently has the specific digital content. Continuing with the above described example, in the alternative embodiments, the first estimate would be four minutes.

In accordance with certain embodiments, each second estimate determined at step 208 can be a sum of an estimate of an amount of time it will take one of the other computing devices (e.g., $112_3$) to complete the process of obtaining the specific digital content, plus an estimate of an amount of time it will take for the specific computing device to complete the download of the specific digital content from the other computing device (e.g., $112_3$) after it has completed the process of obtaining the specific digital content. For example, if it is estimated that it will take the computing device $112_3$ ten minutes to complete the process of obtaining the specific digital content, and it is estimated that it will take the specific computing device $112_1$ five minutes to complete the download of the specific digital content from the other computing device 112₃ after it has completed the process of obtaining the specific digital content, then the second estimate determined at step 208 would be fifteen minutes. In alternative embodiments, each second estimate is an estimate of an amount of time it will take for the specific computing device to complete the download of the specific digital content from the one of the other computing devices, after the one of the other computing devices completes the process of obtaining the specific digital content. Continuing with the above described example, in the alternative embodiments, the second estimate would be five minutes.

At step 210, based on the first and second estimates (determined at steps 206 and 208), there is an identification of one or more of the other computing devices to which to send a download request for the specific digital content.

In certain embodiments, one of the other computing devices identified at step 210 is the other computing device from which the specific computing device is estimated to download the specific digital content at an earliest time, relative to the present time. Additional other computing devices can also be identifying at step 210. More generally, a number N of other computing devices can be identified at step 210, which correspond to the N other computing devices from which the specific computing device is estimated to download the specific digital content at the 1st, 2nd . . . Nth earliest times.

In other embodiments, one of the other computing devices identified at step 210 is the other computing device from which the specific computing device is estimated to download the specific digital content in a shortest amount of time once the specific computing device begins the download. Additional other computing devices can also be identifying at step 210. More generally, a number N of other computing devices can be identified at step 210, which correspond to the N other computing devices from which the specific computing device is estimated to download the specific digital content in the 1st, 2nd . . . Nth shortest amounts of time once the specific computing device begins the download.

At step 212, the sending of a download request for the specific digital content is effected or recommended. This can include, or result in, such a download request for the specific digital content being sent from the specific computing device to at least one of the identified one or more other computing devices. At step 214, the downloading of the specific digital content by the specific computing device is effected. The specific computing device can initiate the sending of the download request(s) and the performing of the downloading associated respectively with steps 212 and 214. Alternatively, a coordinator can send an instruction or recommendation to the specific computing device to send the download request(s) for the specific digital content, and can send an instruction or recommendation to the specific computing device to perform the downloading, associated respectively with steps 212 and 214.

In a peer-to-peer network, a computing device can only function as a seed for a limited number of other computing devices (sometimes referred to as "downloaders") at a time. That limited number may be dynamic, meaning that if a computing device is also performing other functions, such as streaming video or being used to play a video game, then the computing device may only be able to function as a seed for just a few other computing devices, or possibly no other computing devices. In typical implementations of a peer-to-peer network, while a seed computing device is already servicing the maximum number of downloaders that it can, the seed computing device will decline all new download requests that it receives. Further, in typical implementations of a peer-to-peer network, the computing device(s) that send download request(s) to potential seed(s) do not have any knowledge of whether the download request(s) will likely be declined or accepted. The above described embodiments can be used to improve performance of peer-to-peer networks by reducing the likelihood of computing devices sending download requests that will be declined, and by potentially choosing to wait for a relatively fast seed, rather than settling for a relatively slow currently available seed. The relatively fast seed, for which a computing device may wait, can be a currently unavailable seed or a future seed, both of which are examples of delayed seeds, as was explained above.

A specific computing device may need or desire specific digital content within a specified amount of time (e.g., within the next ten minutes). This may occur, for example, because a user of the specific computing device is playing a game and will likely reach a playing level in ten minutes for which the specific computing device does not yet of the digital content. In certain embodiments, if none of (or at least a predetermined minimum number of) the first or second estimates is less than ten minutes, then the specific computing devices may send a download request for the specific digital content directly to a content delivery store (e.g., 132). More generally, the embodiments described with reference to FIG. 2 can be used to reduce the amount of digital content that is downloaded directly from a content delivery store, and thus, reduce costs to a company that is in charge of the content delivery store. However, in situations where downloading digital content from a peer computing device would adversely affect a user's experience, it would be preferable that the user's computing device download the digital content directly from the digital content store. Accordingly, in alternative embodiments, there can be occasions where rather than effecting or recommending that the specific computing device send a download request to one or more of the other "peer" computing devices, there is a recommendation or instruction to send a download request directly to a digital content store.

Figure 3:
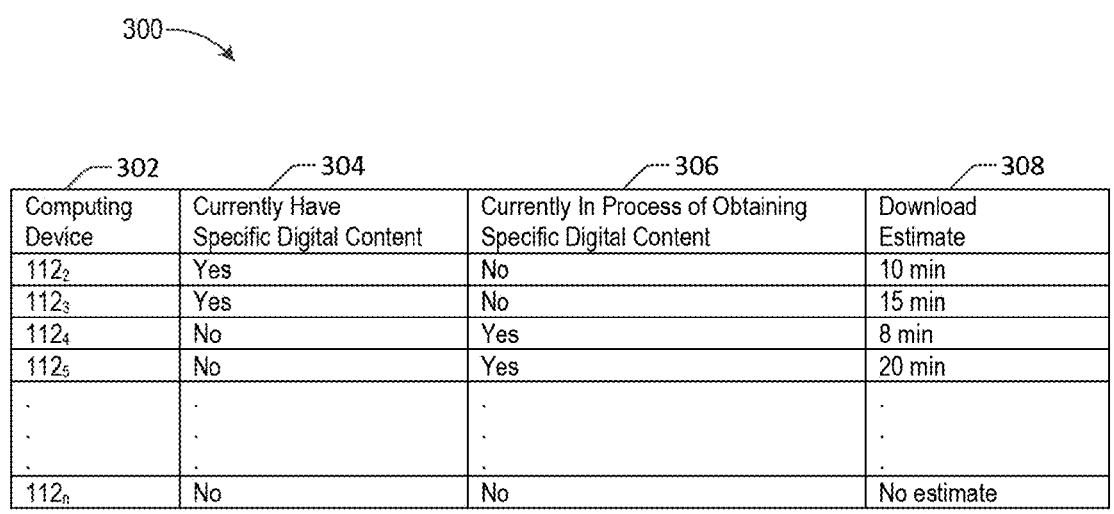
FIG. 3 illustrates an exemplary table that may be generated when the steps of the flow diagram of FIG. 2 are performed.

FIG. 3 illustrates an exemplary table 300 that may be generated by a computing device and/or coordinator that performs steps 202-208. Column 302 of the table 300 lists other computing devices of a peer-to-peer network. Column 304 includes indications of whether or not individual ones of the other computing devices currently have the specific digital content that is needed or desired. Column 306 includes indications of whether or not individual ones of the other computing devices are currently in the process of obtaining the specific digital content. Column 308 includes estimates of the amount of time it would take to download the specific digital content from the various other computing devices listed in column 302.

For other computing devices that currently have the specific digital content, each corresponding estimate in column 308 can be generated by summing an estimate of an amount of time it will take for the other computing device to become available for supporting a download, and an estimate of an amount of the time it will take for the specific computing device to complete the download of the specific digital content once the download begins from one of the other computing devices that currently has the specific digital content. If the other computing device is immediately available for supporting the download of the specific digital content (i.e., is immediately available for sourcing the specific digital content), then that portion of estimate is zero, and the sum will be equal to the estimate of the amount of the time it will take for the specific computing device to complete the download of the specific digital content once the download begins from the other computing device.

For other computing devices that are currently in the process of obtaining the specific digital content, each corresponding estimate in column 308 can be generated by summing an estimate of an amount of time it will take the other computing device to complete the process of obtaining the specific digital content, and an estimate of an amount of time it will take for the specific computing device to complete the download of the specific digital content from the other computing device, after the other computing device completes the process of obtaining the specific digital content.

In alternative embodiments, for other computing devices that currently have the specific digital content, each estimate in column 308 can simply be an estimate of an amount of the time it will take for the specific computing device to complete the download of the specific digital content once the download begins from the other computing device that currently has the specific digital content. Similarly, for other computing devices that are currently in the process of obtaining the specific digital content, each estimate in column 308 can simply be an estimate of an amount of time it will take the specific computing device to complete the download of the specific digital content from the other computing device, after the other computing device completes the process of obtaining the specific digital content. Other variations for generating the estimates are also possible, and are within the scope of an embodiment.

The exemplary table 300 illustrates that the fastest (i.e., shortest) download estimate can correspond to another computing device that is currently in the process of obtaining the specific digital content. This may occur, for example, because the other computing device $112_4$ is almost done obtaining the specific digital content, will be immediately available as a seed once it's done obtaining the specific digital content, and because the data transfer rate between the specific computing device (that needs or desires the specific digital content) and the other computing device $112_4$ is extremely fast. Therefore, a computing device may be better off waiting until a future point in time (when another computing device is ready to seed the specific digital content) to attempt to download specific digital content, rather than immediately attempting to perform the download.

Increasing Swarm Efficiency Through Predictive Seed Selection

In certain embodiments, computing devices are mapped to plurality of different groups based on location information (e.g., time zone and/or geographic region information). Additionally, inter-group information is collected, wherein the inter-group information can include inter-group data transfer rates and/or inter-group availability. Based on the inter-group information, computing devices to which it would be efficient and effective to send download requests for digital content are identified, and such download requests are effected or recommended.

The high level flow diagram of FIG. 4, discussed below, is used to explain these embodiments. More specifically, FIG. 4 will now be used to describe a method for identifying one or more other computing devices of a peer-to-peer network to which a computing device (e.g., $112_1$ in FIG. 1) of the peer-to-peer network sends one or more download requests for digital content. The digital content can either be an entire digital content item that includes a plurality of digital content portions (also referred to as digital content units), a digital content portion of a digital content item that includes a plurality of digital content portions, or a group of digital content portions of a digital content item. The steps described with reference to FIG. 4 can be performed by a coordinator (e.g., 142 in FIG. 1) or a peer computing device (e.g., $112_1$ in FIG. 1), or a combination thereof.

Figure 4:
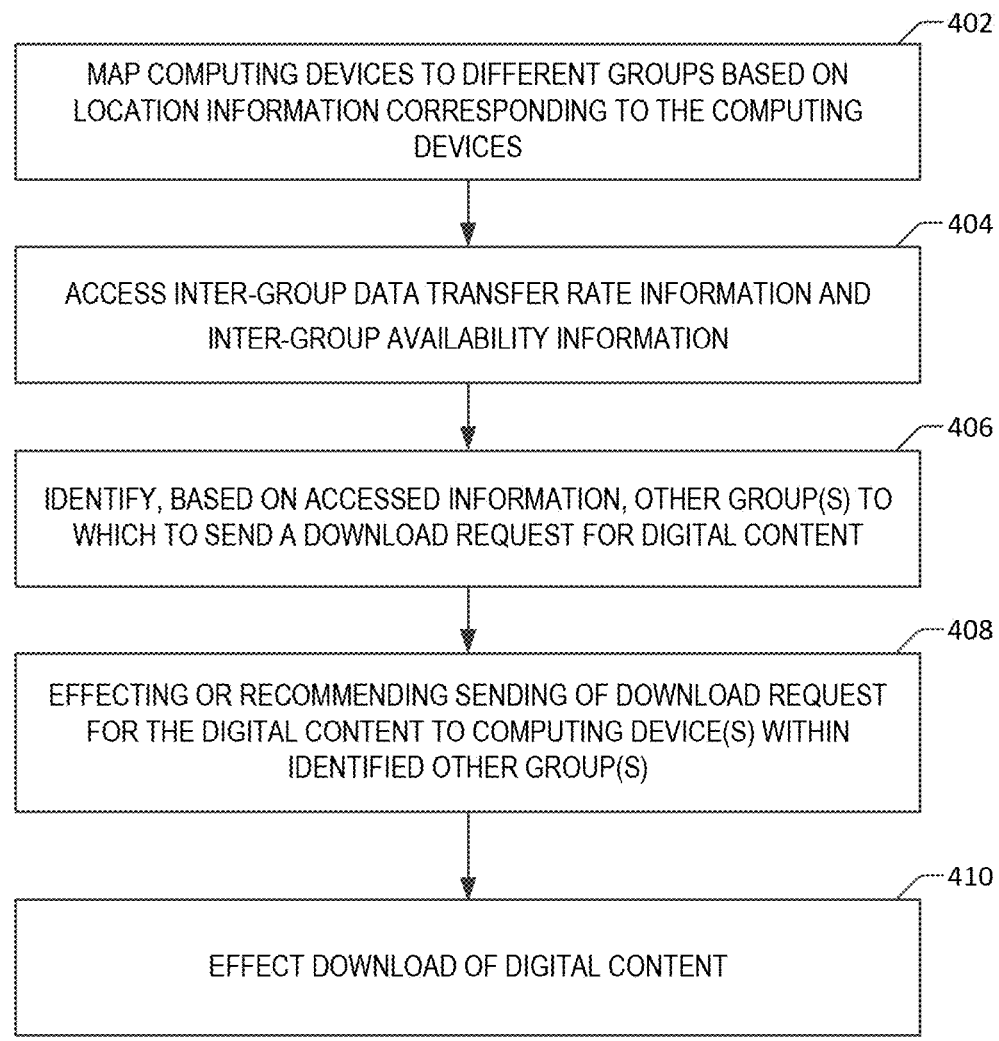
FIG. 4 shows a flow diagram depicting an embodiment of a method for identifying one or more other computing devices of a peer-to-peer network to which to effect or recommend that a computing device of the peer-to-peer network send one or more download requests for digital content.

Referring to FIG. 4, at step 402, each of a plurality of computing devices is mapped to (i.e., grouped into) one of a plurality of different groups based on location information corresponding to each of the plurality of computing devices. The location information can be time zones and/or geographic regions, but is not limited thereto. For example, computing devices within a first time zone, or within a first group of time zones, can be mapped to a first group; computing devices within a second time zone, or within a second group of time zones, can be mapped to a second group; . . . and computing devices within an Nth time zone, or within a Nth group of time zones, can be mapped to an Nth group. There are presently a total of forty time zones in the world. Each time zone can correspond to a different group, or multiple time zones can be mapped to a same group, such that there are less groups than there are total time zones. For another example, computing devices within a first geographic region can be mapped to a first group, computing devices within a second geographic region can be mapped to a second group; . . . and computing devices within an Nth geographic region can be mapped to an Nth group. Different geographic regions can correspond to different continents, different countries, or different regions within a country (e.g., states, provinces, territories, cities, and the like), but are not limited thereto.

At step 404, inter-group information is accessed, which in accordance with specific embodiments, includes at least one inter-group data transfer rate information and inter-group availability information. Where step 404 is performed by a coordinator 142, the inter-group information can be stored locally by the coordinator 142, or can be remotely stored and remotely accessed by the coordinator 142. Where step 404 is performed by a computing device 112, the inter-group information can be stored locally by the computing device 112, or can be remotely stored and remotely accessed by the computing device 112 (e.g., the computing device 112 can access inter-group information stored by the coordinator 142 or some other device). The inter-group data transfer rate information, which can be based on historical information, and optionally also real time information, can specify an average or median speed at which data is transferred between a pair of groups, but is not limited thereto. Similarly, the inter-group availability information, which can be based on historical information, and optionally also real time information, can specify the likelihood that computing devices in a second group will accept download requests from computing devices in a first group, but is not limited thereto.

For simplicity, assume that each of ten-thousand computing devices is mapped to one of three different groups, referred to as group 1, group 2 and group 3, based on time zone information. The inter-group information can include information associated with data transfers between groups 1 and 2, groups 1 and 3, and groups 2 and 3. The inter-group information can be bi-directional, in which case the inter-group data transfer rate information and inter-group availability information between groups 1 and 2 are the same as between groups 2 and 1. Alternatively, the inter-group information can be uni-directional, in which case the inter-group data transfer rate information and inter-group availability information between groups 1 and 2 are different than between groups 2 and 1. The inter-group information can be independent of times of day, or preferably, there can be different inter-group information corresponding to different times of day, and potentially different days of the week. For example, there can be different inter-group information corresponding to different time of day ranges (e.g., 12:00 am to 3:59 am, 4:00 am to 7:59 am, 8:00 am to 11:59 am, 12:00 pm to 3:59 pm, 4:00 pm to 7:59 pm, 8:00 pm to 11:59 pm). Other variations are also possible, and within the scope of an embodiment.

Such embodiments take advantage of predictions (based on historical information, and potentially also real time information) that it will often be faster to download digital content from computing devices located relative far away, than it will be to download digital content from computing devices located relatively close. This is counterintuitive, since latency is typically inversely proportional to the distance that digital content travels. However, these embodiments offset increases in latency with increases in data transfer rates and/or availability. For an example, the states of California, Oreg., and Washington are within the time zone UTC-8 (where UTC stands for Coordinated Universal Time), and the countries that are part of the United Kingdom are within the time zone UTC+0, which is 8 hours ahead of the time zone UTC-8. This means that when it is 8:00 p.m. in California (which is a likely time that users in California may be using their computing devices and wanting to download games or videos) it is 4:00 a.m. in the United Kingdom (which is a likely time that users in the United Kingdom will be sleeping and their computing devices will be idle and likely available as a seed).

Still referring to FIG. 4, at step 406, for one of the computing devices within one of the groups, there is an identification, based on the information accesses at step 404, of one of the other groups to which to send one or more download requests for digital content. Continuing with the above example, if at 8:00 p.m. in California a computing device mapped to a first group corresponding to the time zone UTC-8 indicated that it needed or desired to find a seed computing device from which to download digital content, then a second group corresponding to the time zone UTC+0 may be identified, if the accessed inter-group information indicated fast inter-group data transfer rates and/or high inter-group availability between the first and second groups at 8:00 p.m. in California. Stated another way, the inter-group information accessed at step 404 may indicate that at 8:00 p.m. in the time zone UTC-8 (which is 4:00 a.m. in the time zone UTC+0) there is/are fast inter-group data transfer rates and/or high inter-group availability between a group corresponding to the time zone UTC-8 and a group corresponding to the time zone UTC+0. At step 406, this can result in the group corresponding to the time zone UTC+0 being identified for a computing device within the group corresponding to the time zone UTC-8.

At step 408, the sending of one or more download requests is effected or recommended. Such download request(s) are for the digital content, and are to be sent from the one of the computing devices within one of the groups to one or more computing devices within the identified one of the other groups. This can include, or result in, such a download request for digital content being sent from a computing device to one or more computing devices mapped to the identified other group. At step 410, the downloading of the digital content is effected. The computing device needing or desiring to download the digital content can initiate the sending of the download request(s) and the performing of the downloading associated respectively with steps 408 and 410. Alternatively, a coordinator can send an instruction or recommendation to the computing device to send the download request(s) for the digital content, and can send an instruction to the computing device to perform the downloading, associated respectively with steps 408 and 410.

In the above described embodiments, computing devices that are mapped to the same group can be referred to a local-peers, and computing devices that are mapped to different groups can be referred to a non-local peers. Another potential advantage of downloading digital content from non-local peers is that non-local peers that are ahead in time are more likely to be good seeds for newly released digital content. For example, assume that a worldwide release of a new computer game occurs at 8:00 p.m. local time. This would mean that a computing device in the United Kingdom can download the new game 8 hours earlier than a computing device in California. Thus, when it is 8:00 p.m. in California, it would likely be quicker for a computing device in California to download digital content from a non-local peer in the United Kingdom, not only because of fast inter-group transfer rates and high inter-group availability, but also because it is more likely that non-local peers in the United Kingdom (as compared to local peers in California) already have the newly released digital content. Additionally, by effecting or recommending downloading of digital content from computing devices that are likely idle (e.g., because their users are likely asleep), estimates of the amount of time that it will take to complete downloads can be more accurate, since it is less likely that an available idle seed computing device will drop its connection in the middle of a download (as compared to an available non-idle seed computing device).

Figure 5:
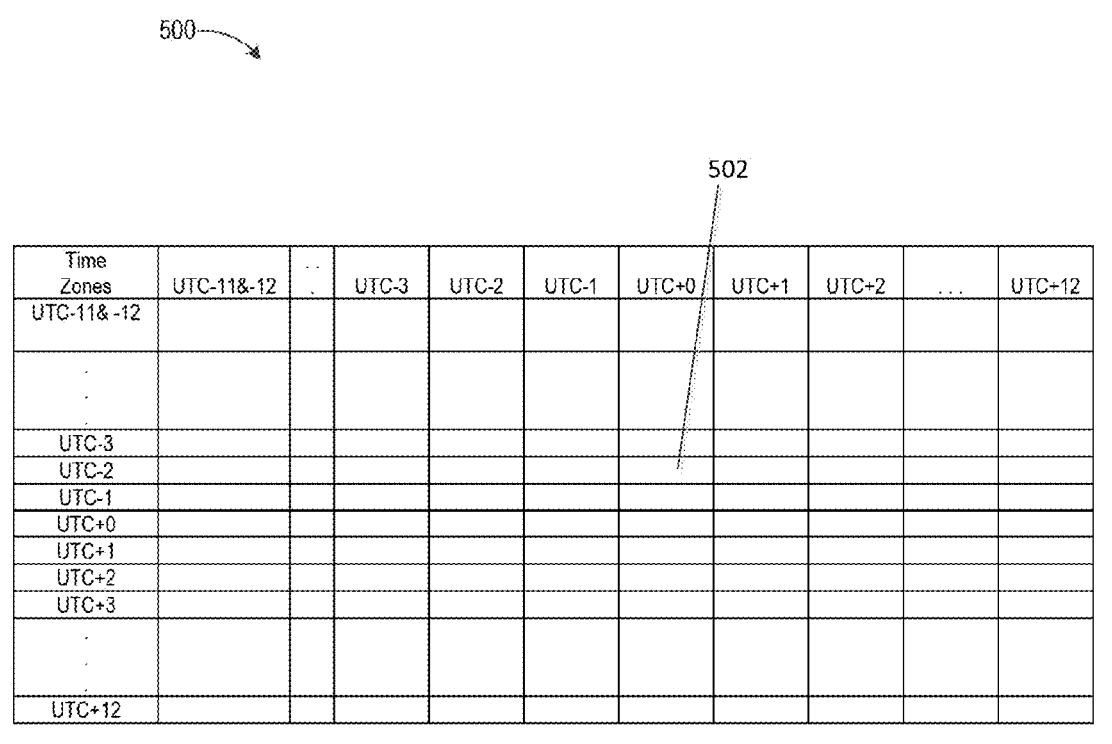

FIG. 5 illustrates a table 500, which is an example of the type of information that may be accessed at step 404. Various time zones are listed along the left most column and across the top most row of the table 500. Each computing device of a peer-to-peer network can be mapped to one of the time zones (or one of the groups of time zones). The cells of the table 500 can be populated with inter-group information, such as, but not limited to, inter-group data transfer rate information and inter-group availability information. For a specific example, the cell labeled 502 can include inter-group data transfer rate information and inter-group availability information between the UTC-2 time zone and the UTC+0 time zone. Similar tables can be generated for different time of day ranges and/or different days of the week, but are not limited thereto. Such tables can be used at step 406 to identify, for a computing device mapped to one of the groups, other group(s) to which to send a download request for digital content, as was described in additional detail above.

As mentioned above, at any given time, the computing devices 112 that are participating in, or are available for, peer-to-peer communication can be referred to as a swarm. Computing devices that are participating in, or are available for, peer-to-peer communications can be part of the same swarm even though they are mapped to different groups. The embodiments described with reference to FIGS. 4 and 5 can increase swarm efficiency by predicting that in many instances computing devices mapped to another group can be the best seeds for a specific computing device.

Region Level Scarcity Mitigation

In certain embodiments, information indicative of scarcity associated with each of the plurality of different digital content units is collected, and the distribution of the digital content units is prioritized in a manner that reduces the scarcity of digital content units having scarcity that exceeds a specified level. Distribution of the digital content units is effected based on results of the prioritizing in order to reduce the scarcity of digital content units having scarcity that exceeds the specified level. Such embodiments should have the effect of improving the distribution of digital content units between computing devices of the peer-to-peer network.

The high level flow diagram of FIG. 6, discussed below, is used to explain these embodiments. More specifically, FIG. 6 will now be used to describe a method for improving distribution of a plurality of different digital content units between a plurality of computing devices of a peer-to-peer network. The steps described with reference to FIG. 4 can be performed by a coordinator (e.g., 142 in FIG. 1) or a computing device (e.g., $112_1$ in FIG. 1), or a combination thereof. Each digital content unit can correspond to an entire digital content item, or can correspond to one or more portions of a digital content item that includes a plurality of digital content portions.

Figure 6:
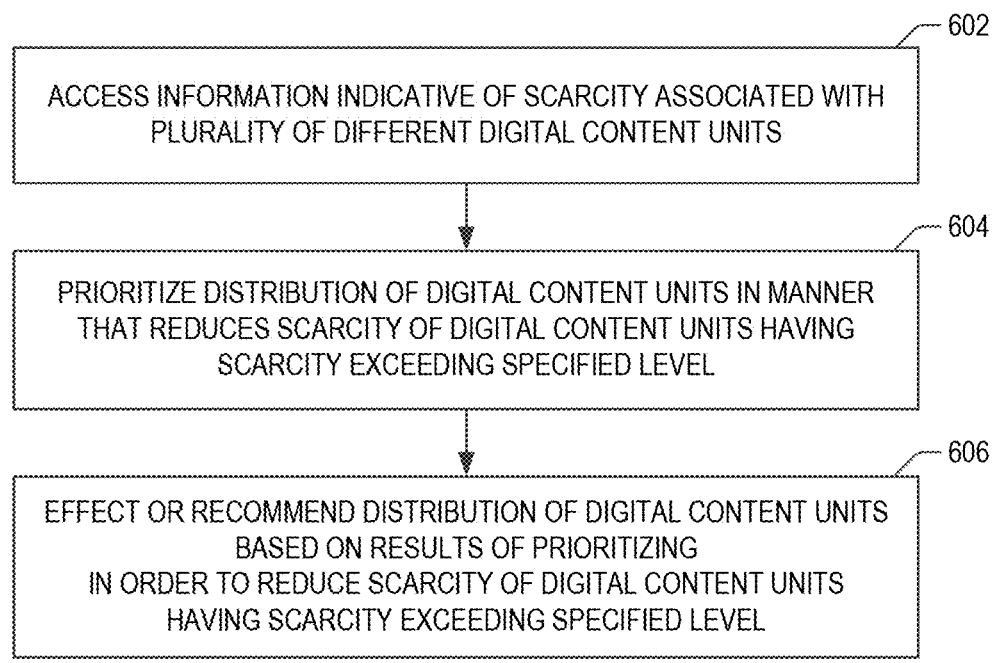
FIG. 6 shows a flow diagram depicting an embodiment of a method for improving distribution of a plurality of different digital content units between a plurality of computing devices of a peer-to-peer network.

Referring to FIG. 6, at step 602, information indicative of scarcity associated with each of the plurality of different digital content units is accessed. The information accessed at step 602 can be indicative of present scarcity and/or predicted future scarcity associated with each of the plurality of different digital content units. Information indicative of scarcity quantifies the frequency (or infrequency) of the digital content within an entire peer-to-peer network, or a portion of the peer-to-peer network. For simplicity, assume that a portion of a peer-to-peer network includes a group of hundred peer computing devices. Also assume that fifty of the one hundred peer computing devices have a copy of a first digital content unit, but only five of the one hundred peer computing devices have a copy of a second digital content unit. Information indicative of scarcity can, for example, specify that the first digital content unit has a 50 out of 100 scarcity, or more simply a scarcity level of two (i.e., 100/50=2); and specify that the second digital content unit has a 5 out of 100 scarcity, or more simply a scarcity level of twenty (i.e., 100/5=20). Continuation with this example, it can be appreciated that the second digital content unit is ten times more scarce than the first digital content unit. Alternative ways of expressing scarcity are also possible, and within the scope of an embodiment. For example, information indicative of scarcity can specify a percentage of (or other quantifier of) computing devices that have specific digital content. In order for the information indicative of scarcity to be accessed at step 602, the information first needs to be collected. In certain embodiments, such information is collected and maintained by a coordinator (e.g., the coordinator 142 in FIG. 1). For example, a coordinator can collect such information when peer computing devices provide the coordinator with lists of digital content that they have and are willing to share with other peer computing devices. For another example, a coordinator can keep track of what peer computing devices download, and can infer scarcity based on such information. For still another example, a coordinator can keep track of how difficult and/or time consuming it is for computing devices to find seeds for specific digital content, and can infer scarcity based on such information. In other embodiments, at least some of the computing devices 112 of the peer-to-peer network can collect and maintain such information for their own use. For example, a peer computing device can collect such information when the peer computing device obtains lists of digital content (from a coordinator and/or other computing devices) that are available for download. In still other embodiments, a computing device can collect and maintain some of the information and can also access some of the information from a coordinator. In other words, a computing device can access its own collected and maintained information and/or access information collected and maintained by a coordinator. It is also possible that another device, referred to as a scarcity assessor, can collect and maintain the above mentioned information, and that the computing devices and/or the coordinator can access such information from the scarcity assessor.

More generally, the method described with reference to FIG. 6 can be performed either by a peer computing device, by a coordinator that communicates with the peer computing devices, by a scarcity assessor, or by a combination of a computing device, a coordinator and/or a scarcity assessor. These are just a few examples, which are not meant to be all encompassing.

At step 604, distribution of the digital content units is prioritized in a manner that reduces the scarcity of digital content units having scarcity that exceeds a specified level. In accordance with an embodiment, digital content units can be ranked according to their scarcity, and the digital content units having the N greatest scarcity levels are considered to exceed the specified level, where N is an integer that is greater than or equal to one. In another embodiment, the X percent (e.g., 10%) of digital content units having the highest scarcity levels are considered to exceed the specified level. In still a further embodiment, an average scarcity level can be determined, and the digital content units exceeding the average (or exceeding the average by a specific percent or a specific standard deviation) can be considered to exceed the specified level. These are just a few examples, which are not meant to be all encompassing. The prioritizing at step 604 can involve prioritizing the distribution of the digital content units in a manner that reduces the scarcity of digital content units having a present scarcity that exceeds the specified level, and/or reduces the scarcity of digital content units having a predicted future scarcity that exceeds the specified level. In certain embodiments, the prioritizing at step 604 is performed in a manner that is predicted to achieve a substantially homogenous scarcity for the plurality of digital content units. For example, the highest priority can be to reduce the scarcity (and thus, increase the abundance) of a digital content unit having the highest level of scarcity; the second highest priority can be to reduce the scarcity of a digital content unit having the second highest level of scarcity; and so on. Additional types of information, such as, but not limited to, demand for specific digital content units can also be used when prioritizing the distribution of digital content units. For example, if two digital content units have the same or substantially the same scarcity, but one is in higher demand than the other, there can be a higher priority to distribute the digital content unit having the higher demand. Present scarcity is indicative of the current levels of scarcity within a peer-to-peer network, or a portion thereof. Predicted future scarcity can be determined be monitoring trends in scarcity levels. For example, if a specific digital content unit's level of scarcity has historically increasing at 10 percent per day, then based on such information, it is possible to predict future levels of scarcity. Predicted future scarcity can also take into account efforts to reduce scarcity that are being performed in accordance with embodiments described herein.

At step 606, distribution of the digital content units based on results of the prioritizing is effected or recommended in order to reduce the scarcity of digital content units having scarcity that exceeds the specified level. Where a coordinator performs the steps of FIG. 6, the coordinator can perform step 606 by instructing (or recommending) that one or more peer computing devices download scarce digital content. This may occur to improve the overall health of the swarm, and thus, may occur whether or not the specific peer computing device(s) that download specific scarce digital content actually need or desire the specific scarce digital content. Similarly, where a peer computing device performs the steps of FIG. 6, the peer computing device can perform step 606 by sending a download request for scarce digital content to one or more other computing devices, whether or not the peer computing device sending the download request actually needs or desires the specific scarce digital content.

The steps described with reference to FIG. 6 can be performed for an entire peer-to-peer network. Alternatively, the computing devices of a peer-to-peer network can be grouped into a plurality of different groups within the peer-to-peer network, and the steps described with reference to FIG. 6 can be performed on a group by group basis. More specifically, separate scarcity information can be accessed for each of a plurality of groups within the peer-to-peer network at step 602, and the prioritizing performed at step 604 can be performed for each of the groups such that the prioritizing is different for different groups. Computing devices can be grouped in various different manners. For example, as was described above with reference to FIGS. 4 and 5, computing devices can be mapped to different groups based on location information (e.g., time zone and/or geographic region information). Alternatively, computing devices can be grouped based on their internet service providers (ISPs). For example, computing devices serviced by a first ISP can be part of a first group, computing devices serviced by a second ISP can be part of a second group, . . . and computing devices serviced by an Nth ISP can be part of an Nth group. In still other embodiments, computing devices can be grouped based on the router to which they are connected, or the router hub to which they are connected. These are just a few examples, which are not meant to be all encompassing.

Figure 7:
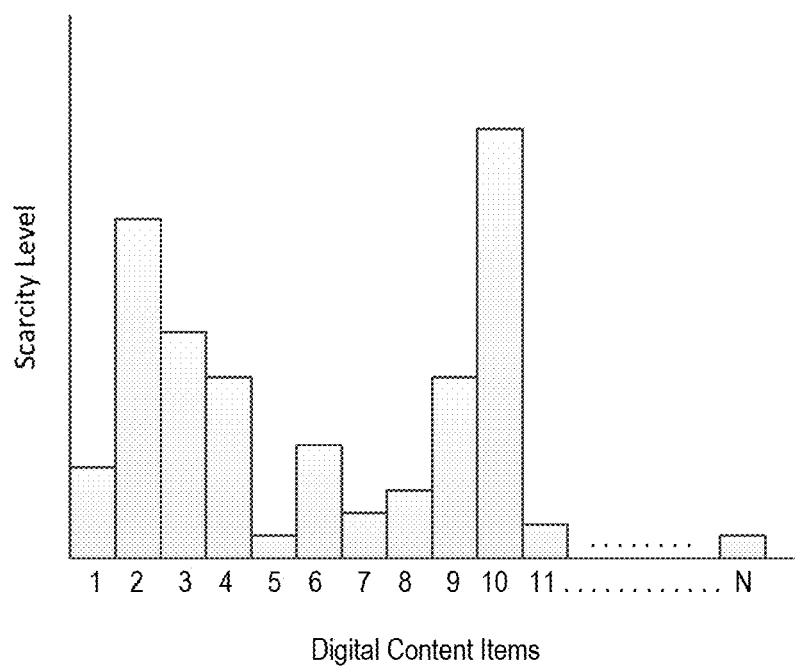
FIG. 7 illustrates an exemplary histogram that shows the relative scarcity of digital content items within a peer-to-peer network, or within a group of computing devices that are part of the peer-to-peer network.

FIG. 7 illustrates an exemplary histogram that shows the relative scarcity of digital content items within a peer-to-peer network, or within a group of computing devices that are part of the peer-to-peer network. Such a histogram is an illustrative example of the type of information that may be accessed at step 602. In FIG. 7, digital content item #10 has the highest scarcity level, and digital content item #2 has the second highest scarcity level. Accordingly, at step 604, distribution of the digital content item #10 may have the highest priority, and distribution of the digital content item #2 may have the second highest priority. As mentioned above, in certain embodiments step 604 is performed in a manner that is predicted to achieve a substantially homogenous scarcity for the plurality of digital content units. If homogenous scarcity was achieved, then the scarcity levels would be the same for all of the digital content items shown in the histogram of FIG. 7. For an example, a goal may be that one hundred different digital content units each have a same (i.e., a homogenous) scarcity level, which corresponds to twenty percent of the computing devices (within a group of one hundred computing devices) having each of the digital content units. One way to achieve this goal would be to effect or recommend that each of the one hundred computing devices obtain a different combination of twenty of the one hundred digital content units, such that each digital content unit has a 20 out of 100 scarcity. This is just an example, which is not meant to be limiting.

Scarcity and abundance are inversely proportion, in that the greater the scarcity the lower the abundance, and the lower the scarcity the greater the abundance. Accordingly, it would also be within the scope of an embodiment to, at step 602, access information indicative of abundance, since information indicative of abundance is also indicative of scarcity (e.g., the digital content item with the lowest abundance has the greatest scarcity, and vice versa). Additionally, it would be within the scope of an embodiment of the present to prioritize distribution of digital content units, at step 604, in a manner the increases abundance of digital content items having an abundance that is below a specified level. Similarly, it would be within the scope of an embodiment to effect or recommend distribution of digital content items, at step 606, in order to increase the abundance of digital content items having an abundance that is below the specified level. In other words, measures of abundance are also indicative of scarcity.

Cooperative Piece Acquisition to Increase Peer Cluster Throughput

As mentioned above, in certain embodiments, computing devices are grouped into clusters of computing devices, and different computing devices within the same cluster are instructed or recommended to send download requests for different digital content units to computing devices outside of the cluster so that the plurality of computing devices within the same cluster will collectively obtain all of the different digital content units. Such embodiments should also have the effect of improving the distribution of digital content units between computing devices of the peer-to-peer network.

Figure 8:
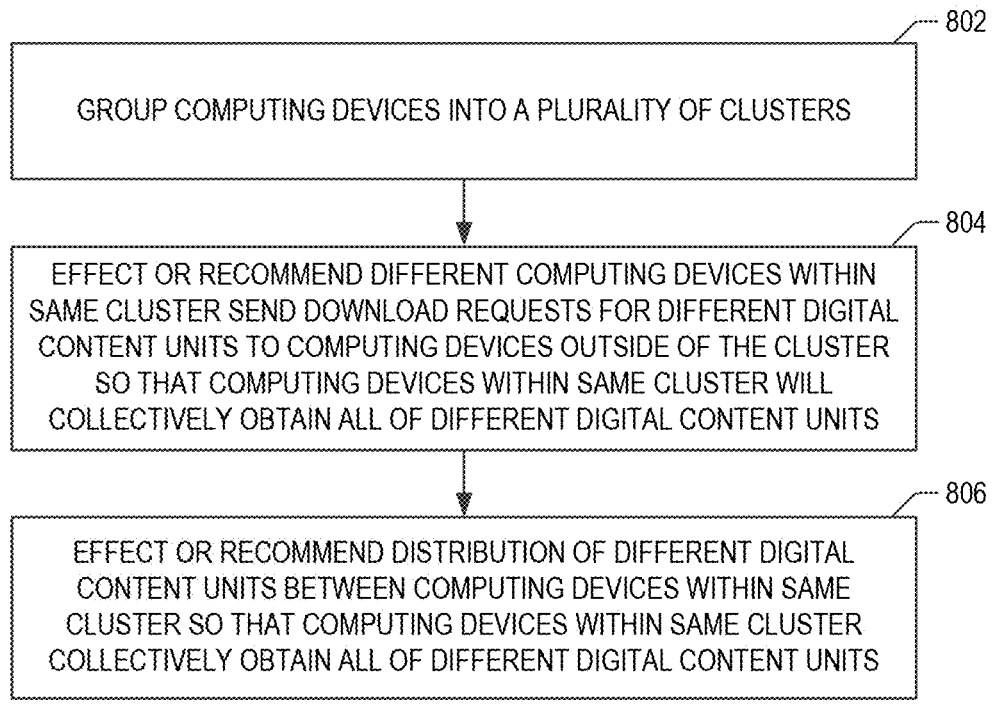
FIG. 8 shows a flow diagram depicting an embodiment of a method for improving distribution of digital content units between computing devices of a peer-to-peer network.

The high level flow diagram of FIG. 8, discussed below, is used to explain these embodiments. More specifically, FIG. 8 will now be used to describe a method for improving the distribution of digital content units between computing devices of a peer-to-peer network. The steps described with reference to FIG. 8 can be performed by a coordinator (e.g., 142 in FIG. 1) or a computing device (e.g., $112_1$ in FIG. 1), or a combination thereof. Referring to FIG. 8, at step 802, computing devices are grouped into a plurality of clusters of computing devices such that each of the clusters will include a plurality of computing devices. In similar manners to those discussed above, the grouping performed at step 802 can be based on the ISPs that service the computing devices, the geographic regions within which the computing devices are located, the time zones within which the computing devices are located, routers or router hubs to which computing devices are connected, but is not limited thereto. Alternatively, or additionally, the grouping performed at step 802 can be performed based on current and/or historical data transfer throughput between the computing devices. For example, computing devices having high current and/or historical data transfer throughput can be grouped together into the same cluster. A cluster, as the term as used herein, is a group of computing devices that work together for the benefit of the group, which typically also benefits the individual computing devices of the group.

At step 804, different computing devices within a same cluster are instructed or recommended to send download requests for different digital content units to computing devices outside of the cluster so that the plurality of computing devices within the same cluster will collectively obtain all of the different digital content units. Instructing a computing device to send a download request is a way of effecting the sending of the download request. In certain embodiments, the computing devices outside of a cluster, to which computing devices within the cluster send download requests, can include content delivery network (CDN) computing devices that support the peer-to-peer network, or more generally, computing devices that manage a digital content store (e.g., 132 in FIG. 1) that supports the peer-to-peer network. For an example, where the steps described with reference to FIG. 8 are performed by a coordinator (e.g., 142 in FIG. 1), the coordinator can perform the grouping associated with step 802; and the coordinator can instruct (or recommend) that computing devices within a cluster send download requests for different digital content units to computing devices outside of the cluster at step 804.

For simplicity, assume that there are one hundred computing devices within a cluster, and each of the computing devices within the cluster needs or desires to obtain one hundred different digital content units. Each of the computing devices can individually attempt to obtain each of the one hundred digital content units from seed computing devices outside of the cluster, or directly from a CDN. However, that would be very inefficient and potentially costly. By contrast, in accordance with certain embodiments, each of the one hundred computing devices within the cluster can obtain a different one of the one hundred different digital content units, which would cause the cluster to collectively obtain all one hundred digital content units.

At step 806, the distribution of the different digital content units between the computing devices with the same cluster is effected or recommended so that the computing devices within the same cluster each obtain all of the different digital content units. Continuing with the above example, the one hundred computing devices within the cluster can each act as a seed (to other computing devices within the cluster) for the one digital content unit that it downloaded. As the individual computing devices within the cluster obtain more digital content units from other computing devices within the cluster, they can act as seeds for more and more of the digital content units.

Steps 804 and 806 can be independently performed for each of the clusters of computing devices. In other words, if step 802 results in computing devices being grouped into twenty clusters, then steps 804 and 806 can be performed for each of the twenty clusters.

Figure 9:
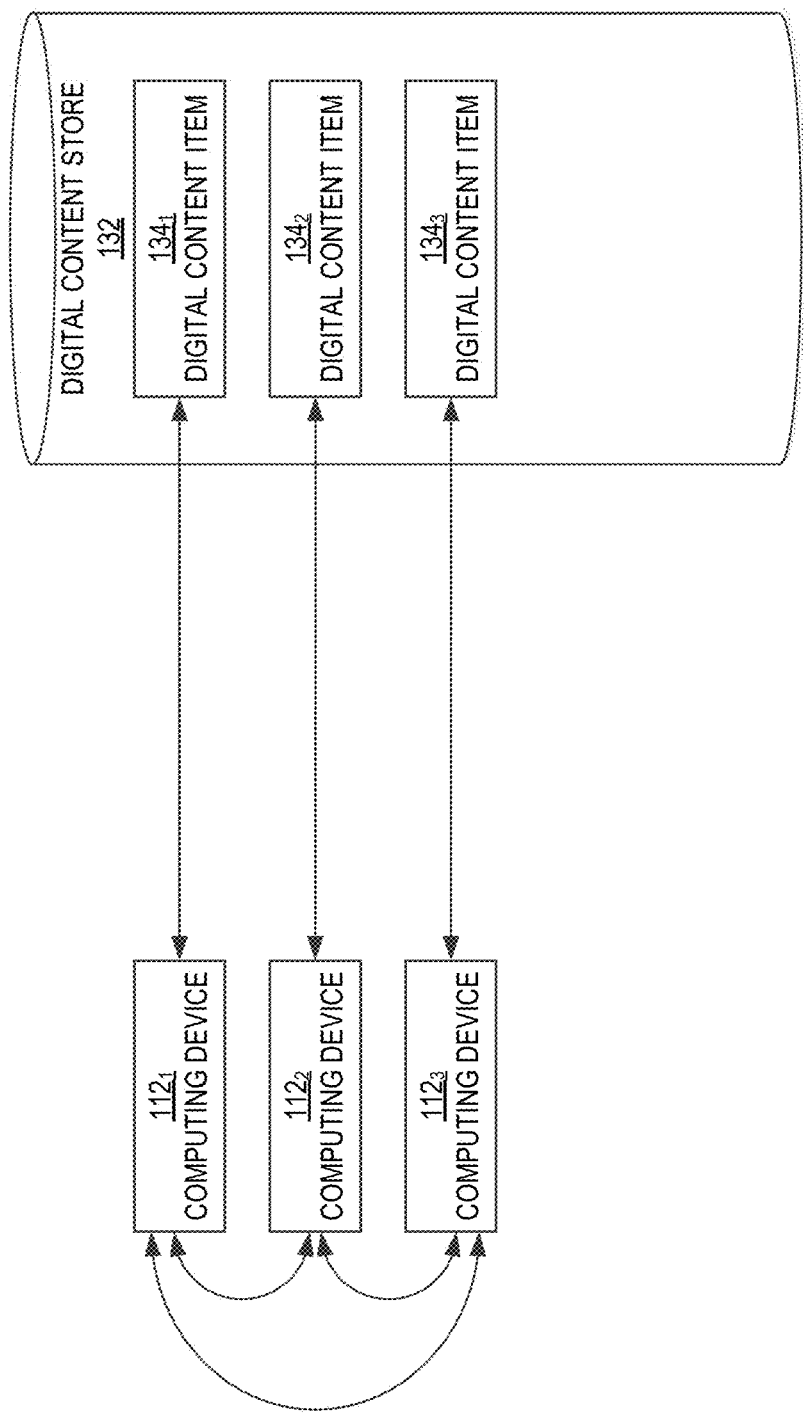
FIG. 9 is a high level block diagram that is used to illustrate an exemplary use of the embodiment described with reference to the flow diagram of FIG. 8.

FIG. 9 will now be used to illustrate an example of the embodiments that were just described with reference to the flow diagram of FIG. 8. For simplicity, assume that a cluster including the three computing devices $112_1$, $112_2$ and $112_3$ each need to download the same three digital contents units $134_1$, $134_2$ and $134_3$. Each of the three computing devices 112 can individually download each of the three digital content items. Alternatively, using embodiments described herein, the computing device $112_1$ can download the digital content item $131_1$, the computing device $112_2$ can download the digital content item $131_2$, and the computing device $112_3$ can download the digital content item $131_3$, which would result in the cluster of computing devices collectively having all three of the digital content items 131. The three computing devices 112 can download the digital content items 131 from a digital content store (e.g., 132), which may or may not be supported by a CDN. It is also within the scope of an embodiment that the computing devices 112 download the digital content items, or at least a portion thereof, from other peer computing devices 112 that are outside of their cluster, as opposed to from a digital content store 132.

The computing device $112_1$ can then download the digital content item $134_2$ from the computing device $112_2$, and download the digital content item $134_3$ from the computing device $112_3$. Similarly, the computing device $112_2$ can then download the digital content items $134_1$ and $134_3$ respectively from the computing devices $112_1$ and $112_3$, and the computing device $112_3$ can then download the digital content items $134_1$ and $134_2$ respectively from the computing devices $112_1$ and $112_2$.

Various embodiments described herein can be combined. For example, embodiments described with reference to FIGS. 6 and 8 can be combined so that at step 804 and/or step 806 the distribution of digital content units is prioritized in dependence on the scarcity of digital content units, so that digital content units with higher levels of scarcity are more quickly obtained by a cluster (from computing devices outside of the cluster) and/or distributed amount the computing devices within the cluster. For another example, embodiments described with reference to FIGS. 4 and 8 can be combined so that at step 408 the effecting or recommending sending download requests is prioritized in dependence on the scarcity of digital content units within a group, so that digital content units with higher levels of scarcity are more quickly obtained by the group (from computing devices in another group). For still another example, the embodiments of FIGS. 2 and 8 can be combined so that the specific digital content, for which information regarding other computing devices that have or are in the processor of obtaining is accessed at steps 202 and 204, is identified (prior to steps 202 and 204) in dependence on information indicative of scarcity, in order to reduce scarcity of digital content having a scarcity that exceeds a specified level. In another example, the embodiments of FIGS. 2 and 4 can be combined so that steps 402-406 are initially performed to identify, based on inter-group information, a second group that likely includes good seed computing devices for a specific computing device mapped to a first group; and then the information accessed at steps 202 and 204 can correspond to other computing devices mapped to the second group identified at step 406. Other combinations of the embodiments described above are also within the scope of embodiments.

Exemplary Computing Device

Figure 10:
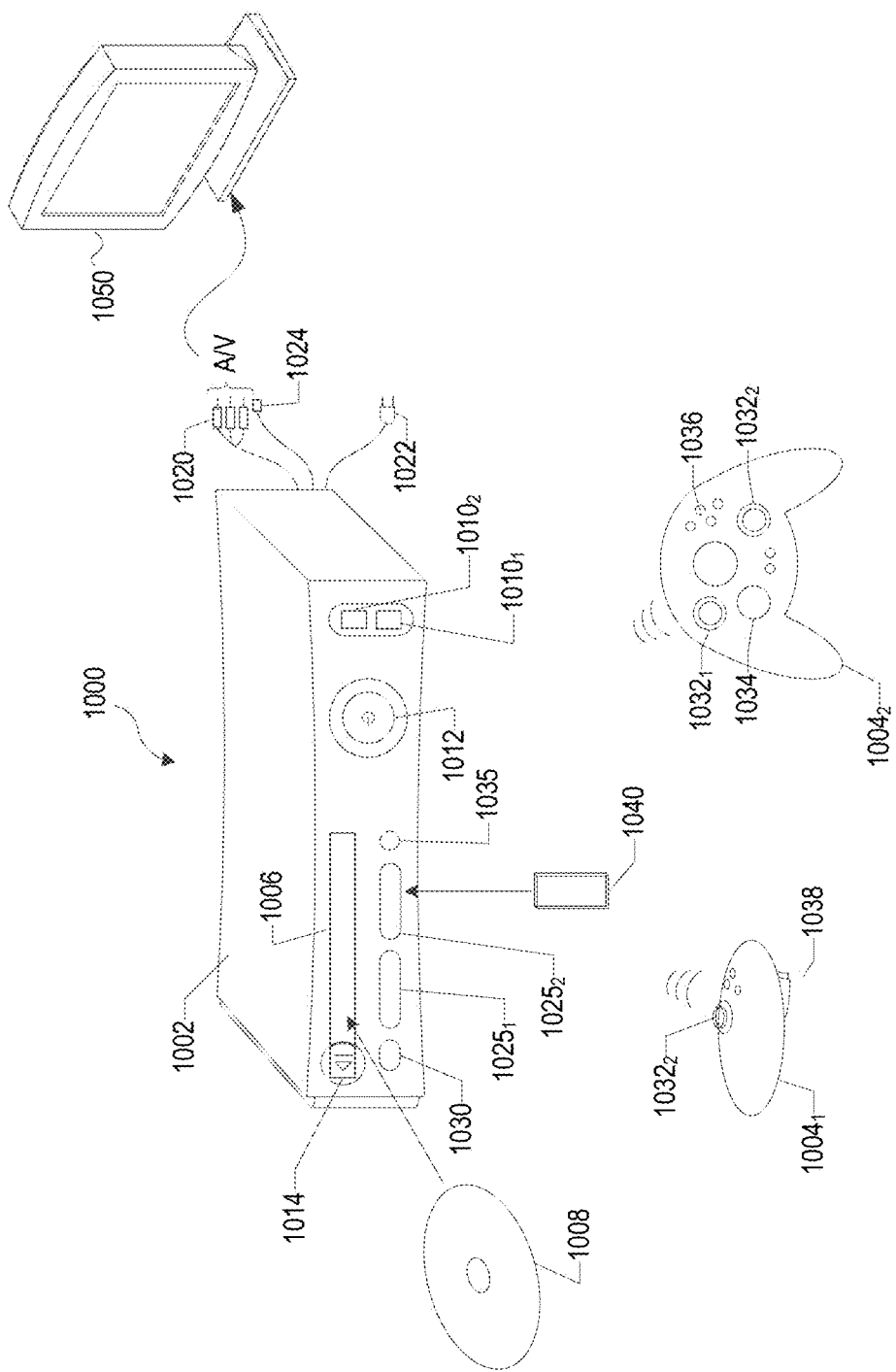
FIG. 10 is an isometric view of an exemplary gaming and media system.

As mentioned above, one or more of the computing devices 112 can be, but is not limited to, a video game console. FIG. 10 will now be used to describe an exemplary video game and media console, or more generally, will be used to describe an exemplary gaming and media system 1000 that includes a game and media console. The following discussion of FIG. 10 is intended to provide a brief, general description of a suitable computing device with which concepts presented herein may be implemented. It is understood that the system of FIG. 10 is by way of example only. In further examples, embodiments describe herein may be implemented using a variety of client computing devices, either via a browser application or a software application resident on and executed by the client computing device. As shown in FIG. 10, a gaming and media system 1000 includes a game and media console (hereinafter "console") 1002. In general, the console 1002 is one type of client computing device. The console 1002 is configured to accommodate one or more wireless controllers, as represented by controllers $1004_1$ and $1004_2$. The console 1002 is equipped with an internal hard disk drive (not shown) and a portable media drive 1006 that support various forms of portable storage media, as represented by an optical storage disc 1008. Examples of suitable portable storage media include DVD, CD-ROM, game discs, and so forth. The console 1002 also includes two memory unit card receptacles $1025_1$ and $1025_2$, for receiving removable flash-type memory units 1040. A command button 1035 on the console 1002 enables and disables wireless peripheral support.

As depicted in FIG. 10, the console 1002 also includes an optical port 1030 for communicating wirelessly with one or more devices and two USB (Universal Serial Bus) ports $1010_1$ and $1010_2$ to support a wired connection for additional controllers, or other peripherals. In some implementations, the number and arrangement of additional ports may be modified. A power button 1012 and an eject button 1014 are also positioned on the front face of the game console 1002. The power button 1012 is selected to apply power to the game console, and can also provide access to other features and controls, and the eject button 1014 alternately opens and closes the tray of a portable media drive 1006 to enable insertion and extraction of a storage disc 1008.

The console 1002 connects to a television or other display (such as monitor 1050) via A/V interfacing cables 1020. In one implementation, the console 1002 is equipped with a dedicated A/V port (not shown) configured for content-secured digital communication using A/V cables 1020 (e.g., A/V cables suitable for coupling to a High Definition Multimedia Interface "HDMI" port on a high definition monitor 1050 or other display device). A power cable 1022 provides power to the game console. The console 1002 may be further configured with broadband capabilities, as represented by a cable or modem connector 1024 to facilitate access to a network, such as the Internet. The broadband capabilities can also be provided wirelessly, through a broadband network such as a wireless fidelity (Wi-Fi) network.

Each controller 1004 is coupled to the console 1002 via a wired or wireless interface. In the illustrated implementation, the controllers 1004 are USB-compatible and are coupled to the console 1002 via a wireless or USB port 1010. The console 1002 may be equipped with any of a wide variety of user interaction mechanisms. In an example illustrated in FIG. 10, each controller 1004 is equipped with two thumbsticks $1032_1$ and $1032_2$, a D-pad 1034, buttons 1036, and two triggers 1038. These controllers are merely representative, and other known gaming controllers may be substituted for, or added to, those shown in FIG. 10.

In one implementation, a memory unit (MU) 1040 may also be inserted into the controller 1004 to provide additional and portable storage. Portable MUs enable users to store game parameters for use when playing on other consoles. In this implementation, each controller is configured to accommodate two MUs 1040, although more or less than two MUs may also be employed.

The gaming and media system 1000 is generally configured for playing games stored on a memory medium, as well as for downloading and playing games, and reproducing prerecorded music and videos, from both electronic and hard media sources. With the different storage offerings, titles can be played from the hard disk drive, from an optical disk media (e.g., 1008), from an online source, or from MU 1040. Samples of the types of media that gaming and media system 1000 is capable of playing include:

Game titles played from CD and DVD discs, from the hard disk drive, or from an online source.

Digital music played from a CD in portable media drive 1006, from a file on the hard disk drive (e.g., music in the Windows Media Audio (WMA) format), or from online streaming sources.

Digital audio/video played from a DVD disc in portable media drive 1006, from a file on the hard disk drive (e.g., Active Streaming Format), or from online streaming sources.

During operation, the console 1002 is configured to receive input from controllers 1004 and display information on the display 1050. For example, the console 1002 can display a user interface on the display 1050 to allow a user to select a game using the controller 1004 and display state solvability information as discussed below.

Figure 11:
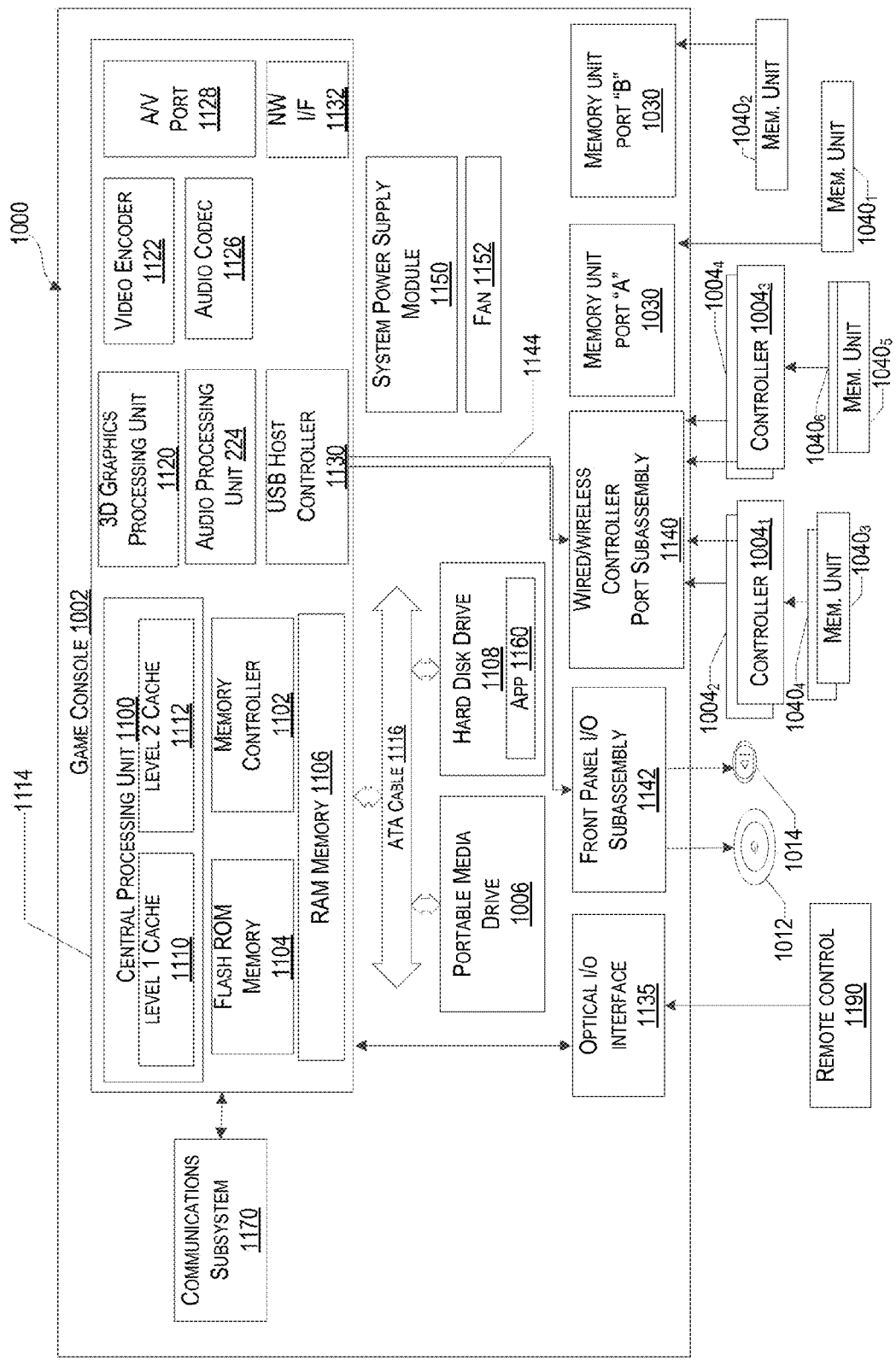
FIG. 11 is an exemplary functional block diagram of components of the gaming and media system shown in FIG. 10.

FIG. 11 is a functional block diagram of the gaming and media system 1000 and shows functional components of the gaming and media system 1000 in more detail. The console 1002 has a central processing unit (CPU) 1100, and a memory controller 1102 that facilitates processor access to various types of memory, including a flash Read Only Memory (ROM) 1104, a Random Access Memory (RAM) 1106, a hard disk drive 1108, and the portable media drive 1006. In one implementation, the CPU 1100 includes a level 1 cache 1110 and a level 2 cache 1112, to temporarily store data and hence reduce the number of memory access cycles made to the hard drive 1108, thereby improving processing speed and throughput.

The CPU 1100, the memory controller 1102, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 1100, the memory controller 1102, the ROM 1104, and the RAM 1106 are integrated onto a common module 1114. In this implementation, the ROM 1104 is configured as a flash ROM that is connected to the memory controller 1102 via a PCI bus and a ROM bus (neither of which are shown). The RAM 1106 is configured as multiple Double Data Rate Synchronous Dynamic RAM (DDR SDRAM) modules that are independently controlled by the memory controller 1102 via separate buses (not shown). The hard disk drive 1108 and the portable media drive 1006 are shown connected to the memory controller 1102 via the PCI bus and an AT Attachment (ATA) bus 1116. However, in other implementations, dedicated data bus structures of different types can also be applied in the alternative.

A three-dimensional graphics processing unit 1120 and a video encoder 1122 form a video processing pipeline for high speed and high resolution (e.g., High Definition) graphics processing. Data are carried from the graphics processing unit 1120 to the video encoder 1122 via a digital video bus (not shown). An audio processing unit 1124 and an audio codec (coder/decoder) 1126 form a corresponding audio processing pipeline for multi-channel audio processing of various digital audio formats. Audio data are carried between the audio processing unit 1124 and the audio codec 1126 via a communication link (not shown). The video and audio processing pipelines output data to an A/V (audio/video) port 1128 for transmission to a television or other display. In the illustrated implementation, the video and audio processing components 1120-1128 are mounted on the module 1114.

FIG. 11 shows the module 1114 including a USB host controller 1130 and a network interface 1132. The USB host controller 1130 is shown in communication with the CPU 1100 and the memory controller 1102 via a bus (e.g., PCI bus) and serves as host for the peripheral controllers $1004_1$-$1004_4$. The network interface 1132 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 11, the console 1002 includes a controller support subassembly 1140 for supporting the four controllers $1004_1$-$1004_4$. The controller support subassembly 1140 includes any hardware and software components to support wired and wireless operation with an external control device, such as for example, a media and game controller. A front panel I/O subassembly 1142 supports the multiple functionalities of power button 1012, the eject button 1014, as well as any LEDs (light emitting diodes) or other indicators exposed on the outer surface of console 1002. Subassemblies 1140 and 1142 are in communication with the module 1114 via one or more cable assemblies 1144. In other implementations, the console 1002 can include additional controller subassemblies. The illustrated implementation also shows an optical I/O interface 1135 that is configured to send and receive signals that can be communicated to the module 1114.

The MUs 1040₁ and 1040₂ are illustrated as being connectable to MU ports "A" 1030₁ and "B" 1030₂ respectively. Additional MUs (e.g., MUs 1040₃-1040₆) are illustrated as being connectable to the controllers 1004₁ and 1004₃, i.e., two MUs for each controller. The controllers 1004₂ and 1004₄ can also be configured to receive MUs (not shown). Each MU 1040 offers additional storage on which games, game parameters, and other data may be stored. In some implementations, the other data can include any of a digital game component, an executable gaming application, an instruction set for expanding a gaming application, and a media file. When inserted into the console 1002 or a controller, the MU 1040 can be accessed by the memory controller 1102.

A system power supply module 1150 provides power to the components of the gaming system 1000. A fan 1152 cools the circuitry within the console 1002.

An application 1160 comprising machine instructions is stored on the hard disk drive 1108. When the console 1002 is powered on, various portions of the application 1160 are loaded into RAM 1106, and/or caches 1110 and 1112, for execution on the CPU 1100, wherein the application 1160 is one such example. Various applications can be stored on the hard disk drive 1108 for execution on CPU 1100.

The console 1002 is also shown as including a communication subsystem 1170 configured to communicatively couple the console 1002 with one or more other computing devices (e.g., other consoles). The communication subsystem 1170 may include wired and/or wireless communication devices compatible with one or more different communication protocols. As non-limiting examples, the communication subsystem 1170 may be configured for communication via a wireless telephone network, or a wired or wireless local- or wide-area network. In some embodiments, the communication subsystem 1170 may allow the console 1002 to send and/or receive messages to and/or from other devices via a network such as the Internet. In specific embodiments, the communication subsystem 1170 can be used to communicate with a coordinator and/or other computing devices, for sending download requests, and for effecting downloading and uploading of digital content. More generally, the communication subsystem 1170 can enable the console 1002 to participate on peer-to-peer communications.

The gaming and media system 1000 may be operated as a standalone system by simply connecting the system to monitor 1050 (FIG. 10), a television, a video projector, or other display device. In this standalone mode, the gaming and media system 1000 enables one or more players to play games, or enjoy digital media, e.g., by watching movies, or listening to music. However, with the integration of broadband connectivity made available through network interface 1132, or more generally the communication subsystem 1170, the gaming and media system 1000 may further be operated as a participant in a larger network gaming community, such as a peer-to-peer network, as discussed above in connection with FIG. 1.

The above described gaming and media console 1002 is just one example of the computing devices 112 discussed above with reference to FIG. 1 and various other FIGS. As was explained above, there are various other types of computing devices with which embodiments described herein can be used.

The terms "module" and "program" may be used to describe an aspect of a computing device or system implemented to perform a particular function. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. For example, the subject matter of the present disclosure also includes all combinations and subcombinations of the various routines and methods, systems and configurations, and other features, functions, acts, and/or properties disclosed herein, as well as any and all equivalents thereof.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

The invention claimed is:

1. A method for identifying one or more other computing devices of a peer-to-peer network to which to effect or recommend that a specific computing device of the peer-to-peer network send a download request for specific digital content, the method comprising:

accessing information regarding one or more of the other computing devices that currently have the specific digital content;

accessing information regarding one or more of the other computing devices that are currently in a process of obtaining the specific digital content;

based on the information regarding the one or more of the other computing devices that currently have the specific digital content, determining one or more first estimates of an amount of time it will take for the specific computing device to download the specific digital content from each of the one or more of the other computing devices that currently have the specific digital content, wherein each of the one or more first estimates is based at least in part on a sum of estimates of an amount of time it will take one of the other computing devices that currently has the specific digital content to become available for supporting a download, and an amount of the time it will take for the specific computing device to complete the download of the specific digital content once the download begins from the one of the other computing devices that currently has the specific digital content;

based on the information regarding the one or more of the other computing devices that are currently in the process of obtaining the specific digital content, determining one or more second estimates of an amount of time it will take for the specific computing device to download the specific digital content from each of the one or more of the other computing devices that are currently in the process of obtaining the specific digital content, wherein each of the one or more second estimates is based at least in part on a sum of estimates of an amount of time it will take one of the other computing devices to complete the process of obtaining the specific digital content, and an amount of time it will take for the specific computing device to complete the download of the specific digital content from the one of the other computing devices, after the one of the other computing devices completes the process of obtaining the specific digital content;

identifying, based on the determined first and second estimates, one or more of the other computing devices to which to send the download request for the specific digital content; and effecting or recommending sending of the download request for the specific digital content from the specific computing device to at least one of the identified one or more other computing devices.

2. The method of claim 1, wherein:
each first estimate is equal to the sum of estimates of
an the amount of time it will take one of the other computing devices that currently has the specific digital content to become available for supporting a download, and
an amount of the time it will take for the specific computing device to complete the download of the specific digital content once the download begins from the one of the other computing devices that currently has the specific digital content; and
each second estimate is equal to the sum of estimates of
an amount of time it will take one of the other computing devices to complete the process of obtaining the specific digital content, and
an amount of time it will take for the specific computing device to complete the download of the specific digital content from the one of the other computing devices, after the one of the other computing devices completes the process of obtaining the specific digital content.

3. The method of claim 1, wherein the identifying includes:
determining, for each of a plurality of different snapshots in time, which one or more of the other computing devices will be available for downloading the specific digital content, wherein at least one of the snapshots corresponds to a current point in time and at least one of the snapshots corresponds to a future point in time; and
identifying, based on results the determining, at least one of the one or more of the other computing devices to which to send the download request for the specific digital content.

4. The method of claim 1, wherein the identifying includes one of the following:
identifying, as one of the other computing devices to which to send the download request for the specific digital content, the one of the other computing devices from which the specific computing device is estimated to complete the download of the specific digital content at an earliest time relative to a present time; and
identifying, as one of the other computing devices to which to send the download request for the specific digital content, the one of the other computing devices from which the specific computing device is estimated to download the specific digital content in a shortest amount of time once the download begins.

5. The method of claim 1, wherein:
the identifying includes identifying one of the other computing devices that is currently in the process of obtaining the specific digital content; and
the effecting or recommending includes
waiting until the identified one of the other computing devices, that is currently in the process of obtaining the specific digital content, has finished obtained the specific digital content, and
after the identified one of the other computing devices has finished obtained the specific digital content, effecting or recommending sending of the download request for the specific digital content from the specific computing device to the identified one of the other computing devices.

6. The method of claim 1, wherein the specific computing device needs or desires a plurality of different digital content, and further comprising:
accessing information indicative of scarcity associated with the plurality of different digital content; and
identifying the specific digital content, for which the specific computing device is to send one or more of the download requests, in dependence on the information indicative of scarcity, in order to reduce scarcity of digital content having a scarcity that exceeds a specified level.

7. The method of claim 1, wherein the specific computing device is mapped to one of a plurality of different groups based on location information corresponding to each of the plurality of computing devices, and further comprising;
accessing inter-group information including at least one of inter-group data transfer rate information and inter-group availability information; and
for the specific computing device, which is mapped to one of the groups, identifying, based on the accessed inter-group information, one of the other groups;
wherein the computing devices, for which information is accessed at the accessing steps, corresponds to computing devices mapped to the one of the other groups identified based on the accessed inter-group information.

8. A device comprising one or more storage devices including processor readable code, and one or more processors in communication with the one or more storage devices to execute the processor readable code to:
access information regarding one or more other computing devices of a peer-to-peer network that currently have specific digital content that is needed or desired by a specific computing device of the peer-to-peer network;
access information regarding one or more other computing devices of the peer-to-peer network that are currently in a process of obtaining the specific digital content;
based on the information regarding the one or more other computing devices that currently have the specific digital content, determine one or more first estimates of an amount of time it will take for the specific computing device to download the specific digital content from each of the one or more of the other computing devices that currently have the specific digital content, wherein each of the one or more first estimates is based at least in part on a sum of estimates of
    an amount of time it will take one of the other computing devices that currently has the specific digital content to become available for supporting a download, and
    an amount of the time it will take for the specific computing device to complete the download of the specific digital content once the download begins from the one of the other computing devices that currently has the specific digital content;
based on the information regarding the one or more of the other computing devices that are currently in the process of obtaining the specific digital content, determine one or more second estimates of an amount of time it will take for the specific computing device to download the specific digital content from each of the one or more of the other computing devices that are currently in the process of obtaining the specific digital content, wherein each of the one or more second estimates is based at least in part on an estimate of at least one of
    an amount of time it will take one of the other computing devices to complete the process of obtaining the specific digital content, or
    an amount of time it will take for the specific computing device to complete the download of the specific digital content from the one of the other computing devices, after the one of the other computing devices completes the process of obtaining the specific digital content;
identify, based on the determined first and second estimates, one or more of the other computing devices to which to send a download request for the specific digital content; and
effect or recommend sending of the download request for the specific digital content from the specific computing device to at least one of the identified one or more other computing devices.

9. The device of claim 8, wherein:
each first estimate is equal to the sum of estimates of
    an amount of time it will take one of the other computing devices that currently has the specific digital content to become available for supporting a download, and
    an amount of the time it will take for the specific computing device to complete the download of the specific digital content once the download begins from the one of the other computing devices that currently has the specific digital content; and
each second estimate is equal to a sum of estimates of
    an amount of time it will take one of the other computing devices to complete the process of obtaining the specific digital content, and
    an amount of time it will take for the specific computing device to complete the download of the specific digital content from the one of the other computing devices, after the one of the other computing devices completes the process of obtaining the specific digital content.

10. The device of claim 8, wherein the processor readable code to identify one or more of the other computing devices to which to send a download request for the specific digital content, includes processor readable code to:
    determine, for each of a plurality of different snapshots in time, which one or more of the other computing devices will be available for downloading the specific digital content, wherein at least one of the snapshots corresponds to a current point in time and at least one of the snapshots corresponds to a future point in time; and
    identify, based on results the determining, at least one of the one or more of the other computing devices to which to send the download request for the specific digital content.

11. The device of claim 8, wherein the processor readable code to identify one or more of the other computing devices to which to send a download request for the specific digital content, includes at least one of the following:
    processor readable code to identify, as one of the other computing devices to which to send the download request for the specific digital content, the one of the other computing devices from which the specific computing device is estimated to complete the download of the specific digital content at an earliest time relative to a present time; or
    processor readable code to identify, as one of the other computing devices to which to send the download request for the specific digital content, the one of the other computing devices from which the specific computing device is estimated to download the specific digital content in a shortest amount of time once the download begins.

12. The device of claim 8, wherein:
the processor readable code to identify one or more of the other computing devices to which to send a download request for the specific digital content, includes processor readable code to identify one of the other computing devices that is currently in the process of obtaining the specific digital content; and
the processor readable code to effect or recommend includes processor readable code to
    wait until the identified one of the other computing devices, that is currently in the process of obtaining the specific digital content, has finished obtained the specific digital content, and
    after the identified one of the other computing devices has finished obtained the specific digital content, effect or recommend sending of the download request for the specific digital content from the specific computing device to the identified one of the other computing devices.

13. The device of claim 8, wherein the specific computing device needs or desires a plurality of different digital content, and further comprising:
    accessing information indicative of scarcity associated with the plurality of different digital content; and
    identifying the specific digital content, for which the specific computing device is to send one or more of the download requests, in dependence on the information indicative of scarcity, in order to reduce scarcity of digital content having a scarcity that exceeds a specified level.

14. The device of claim 8, wherein the specific computing device is mapped to one of a plurality of different groups based on location information corresponding to each of the plurality of computing devices, and wherein the one or more storage devices further include processor readable code to:
    access inter-group information including at least one of inter-group data transfer rate information and inter-group availability information; and
    for the specific computing device, which is mapped to one of the groups, identify, based on the accessed inter-group information, one of the other groups;
    wherein the other computing devices, for which information is accessed, corresponds to computing devices mapped to the one of the other groups identified based on the accessed inter-group information.

15. One or more processor readable storage devices having instructions encoded thereon which when executed cause one or more processors to perform a method for identifying one or more other computing devices of a peer-to-peer network to which to effect or recommend that a specific computing device of the peer-to-peer network send a download request for specific digital content, the method comprising:

accessing information regarding one or more of the other computing devices that currently have the specific digital content;

accessing information regarding one or more of the other computing devices that are currently in a process of obtaining the specific digital content;

based on the information regarding the one or more of the other computing devices that currently have the specific digital content, determining one or more first estimates of an amount of time it will take for the specific computing device to download the specific digital content from each of the one or more of the other computing devices that currently have the specific digital content, wherein each of the one or more first estimates is based at least in part on an estimate of at least one of an amount of time it will take one of the other computing devices that currently has the specific digital content to become available for supporting a download, or an amount of the time it will take for the specific computing device to complete the download of the specific digital content once the download begins from the one of the other computing devices that currently has the specific digital content;

based on the information regarding the one or more of the other computing devices that are currently in the process of obtaining the specific digital content, determining one or more second estimates of an amount of time it will take for the specific computing device to download the specific digital content from each of the one or more of the other computing devices that are currently in the process of obtaining the specific digital content, wherein each of the one or more second estimates is based at least in part on a sum of estimates of an amount of time it will take one of the other computing devices to complete the process of obtaining the specific digital content, and an amount of time it will take for the specific computing device to complete the download of the specific digital content from the one of the other computing devices, after the one of the other computing devices completes the process of obtaining the specific digital content;

identifying, based on the determined first and second estimates, one or more of the other computing devices to which to send the download request for the specific digital content; and effecting or recommending sending of the download request for the specific digital content from the specific computing device to at least one of the identified one or more other computing devices.

16. The one or more processor readable storage devices of claim 15, wherein:

each first estimate is equal to a sum of estimates of an amount of time it will take one of the other computing devices that currently has the specific digital content to become available for supporting a download, and an amount of the time it will take for the specific computing device to complete the download of the specific digital content once the download begins from the one of the other computing devices that currently has the specific digital content; and each second estimate is equal to the sum of estimates of an amount of time it will take one of the other computing devices to complete the process of obtaining the specific digital content, and an amount of time it will take for the specific computing device to complete the download of the specific digital content from the one of the other computing devices, after the one of the other computing devices completes the process of obtaining the specific digital content.

17. The one or more processor readable storage devices of claim 15, wherein the identifying includes:

determining, for each of a plurality of different snapshots in time, which one or more of the other computing devices will be available for downloading the specific digital content, wherein at least one of the snapshots corresponds to a current point in time and at least one of the snapshots corresponds to a future point in time; and identifying, based on results the determining, at least one of the one or more of the other computing devices to which to send the download request for the specific digital content.

18. The one or more processor readable storage devices of claim 15, wherein the specific computing device is mapped to one of a plurality of different groups based on location information corresponding to each of the plurality of computing devices, and the method further comprising;

accessing inter-group information including at least one of inter-group data transfer rate information and inter-group availability information; and for the specific computing device, which is mapped to one of the groups, identifying, based on the accessed inter-group information, one of the other groups;

wherein the computing devices, for which information is accessed at the accessing steps, corresponds to computing devices mapped to the one of the other groups identified based on the accessed inter-group information.

* * * * *